US010077367B2

(12) United States Patent
Hara et al.

(10) Patent No.: US 10,077,367 B2
(45) Date of Patent: Sep. 18, 2018

(54) COATED METAL PLATE AND EXTERIOR BUILDING MATERIAL

(71) Applicant: NISSHIN STEEL CO., LTD., Tokyo (JP)

(72) Inventors: Taketo Hara, Chiba (JP); Hirokazu Yano, Chiba (JP); Kenji Sakato, Chiba (JP); Kazuhiko Takahashi, Chiba (JP)

(73) Assignee: NISSHIN STEEL CO., LTD., Tokyo (JP)

( * ) Notice: Subject to any disclaimer, the term of this patent is extended or adjusted under 35 U.S.C. 154(b) by 0 days.

(21) Appl. No.: 15/128,266

(22) PCT Filed: Mar. 26, 2014

(86) PCT No.: PCT/JP2014/001744
§ 371 (c)(1),
(2) Date: Sep. 22, 2016

(87) PCT Pub. No.: WO2015/145482
PCT Pub. Date: Oct. 1, 2015

(65) Prior Publication Data
US 2017/0101545 A1 Apr. 13, 2017

(30) Foreign Application Priority Data
Mar. 24, 2014 (JP) ................. 2014-059950

(51) Int. Cl.
*B21D 39/00* (2006.01)
*C09D 7/42* (2018.01)
(Continued)

(52) U.S. Cl.
CPC ............... *C09D 7/42* (2018.01); *C09D 7/005* (2013.01); *C09D 7/1216* (2013.01); *C09D 7/61* (2018.01); *C23C 26/00* (2013.01)

(58) Field of Classification Search
CPC ........... B32B 5/18; B32B 15/18; B32B 15/20; C09D 5/08; C09D 7/1283; C09D 7/005; B05D 5/02; B05D 5/17; B05D 5/54
(Continued)

(56) References Cited

U.S. PATENT DOCUMENTS

2011/0236632 A1* 9/2011 Hosokawa ............ B05D 5/063
428/141
2017/0015837 A1* 1/2017 Takaoka ................. B32B 15/18

FOREIGN PATENT DOCUMENTS

JP 5-228433 A 9/1993
JP 10-128905 A 5/1998
(Continued)

OTHER PUBLICATIONS

TAFTIC(TM) ASF series [online], Toyobo AP department, Apr. 9, 2014 (searching date), Product introduction: Polyacrylonitrite type particles, Excellent matting agent TAFTIC ASF series <URL;http://toyobo.co.jp/seihin/ap/taftic/pan/asf.html>.
(Continued)

*Primary Examiner* — David Sample
*Assistant Examiner* — Mary I Omori
(74) *Attorney, Agent, or Firm* — Brundidge & Stanger, P.C.

(57) ABSTRACT

This coated metal plate is a chromate-free coated metal plate for exterior applications, which comprises a metal plate and a coating film that is arranged on the metal plate. The coating film contains 0.2-15 vol % of porous particles as a gloss control agent, and contains 0.2-15 vol % of primary particles as a matting agent. If R1 (μm) is the number average particle diameter of the gloss control agent, R2 (μm) is the number average particle diameter of the matting agent, T (μm) is the film thickness of the coating film, σ1 (μm) is the standard deviation of the number-based particle size distribution of the gloss control agent and σ2 (μm) is the standard deviation of the number-based particle size distribution of the matting agent, the coated metal plate satisfies the following formulae.

$(R1+2\sigma1)/T \leq 0.7$ $R1 \geq 2.0$ $2.0 \leq (R2+2\sigma2)/T \leq 7.0$ $13 \leq T \leq 20$.

25 Claims, 7 Drawing Sheets

(51) Int. Cl.
  *C09D 7/00*    (2018.01)
  *C09D 7/12*    (2006.01)
  *C23C 26/00*   (2006.01)
  *C09D 7/61*    (2018.01)

(58) Field of Classification Search
  USPC .......................................................... 428/623
  See application file for complete search history.

(56) References Cited

FOREIGN PATENT DOCUMENTS

| | | | |
|---|---|---|---|
| JP | 2002-178447 A | 6/2002 | |
| JP | 2004-154993 A | 6/2004 | |
| JP | 2004-244720 A | 9/2004 | |
| JP | 2004-269921 A | 9/2004 | |
| JP | 2009-233498 A | 10/2009 | |
| JP | 2011-148107 A | 8/2011 | |
| JP | 2011-207208 A | 10/2011 | |
| JP | 2012-082944 A | 4/2012 | |
| JP | 2012-214010 A | 11/2012 | |
| JP | 2012-214676 A | 11/2012 | |
| JP | 5568191 B1 * | 8/2014 | ............. B32B 15/18 |
| WO | 2010/071150 A1 | 6/2010 | |

OTHER PUBLICATIONS

International Search Report from International Application No. PCT/JP2014/001744 dated Jul. 1, 2014.

* cited by examiner

COATED METAL PLATE AND EXTERIOR BUILDING MATERIAL

TECHNICAL FIELD

The present invention relates to a coated metal sheet for exterior use and an exterior building material.

BACKGROUND ART

Coated metal sheets, excellent in versatility, designability, durability and the like, have been used in various applications. In coated metal sheets for exterior building material applications, mainly from the viewpoint of designability, a gloss adjusting agent is usually blended in an overcoat coating film which is a surface of the coated metal sheet surface. Silica is usually used as the above-described gloss adjusting agent in the coated metal sheets for exterior building materials. The particle diameter of the silica is usually specified by an average particle diameter. The average particle diameter of the silica as the gloss adjusting agent in the coated metal sheet is usually from 3 to 30 μm, depending on the color and the application (for example, see PTL 1 (paragraph 0018)). Additionally, in order to provide the coating film with unevenness to thereby provide the appearance and texture of a so-called "matte coated steel sheet", it is necessary to further add a matting agent having a particle diameter larger than that of the gloss adjusting agent. Examples of the type of the matting agent include glass beads, resin beads and the like. The average particle diameter of the matting agent is usually from 10 to 50 μm (for example, see PTL 2 (paragraph 0016)).

CITATION LIST

Patent Literature

PTL 1
Japanese Patent Application Laid-Open No. 2011-148107
PTL 2
Japanese Patent Application Laid-Open No. 2004-154993

SUMMARY OF INVENTION

Technical Problem

As coated metal sheets for exterior building materials, chromate-coated steel sheets are used. Efforts have been made to improve the molding processability or the corrosion resistance at cut ends for the chromate-coated steel sheets, which thus have had long-term durability. Meanwhile, strong interest has been shown to environmental preservation in recent years also in the technical field of exterior building materials. Accordingly, legal regulations to ban the use of components that adversely affect or cause a concern about possibility of adversely affecting the environment have been under consideration. For example, total prohibition of the use of hexavalent chromium components, generally used in coated metal sheets as an anti-rust component, in the near future is under consideration. Also for chromate-free coated steel sheets, various considerations have been made such as pre-coating treatment, optimization of anti-rust pigments and the like, and characteristics obtained at molding processed portions and cut ends are comparable to those of the chromate-coated steel sheets.

However, the corrosion resistance of the flat portion in chromate-coated steel sheets did not lead to a large problem, while corrosion in the flat portion in chromate-free coated steel sheets may become severe. Particularly when silica is used as the above-described gloss adjusting agent, corrosion such as stain rust, coating film blistering and the like, in the flat portion has occurred during actual use in some cases, before the intended age of service, as shown in FIG. 1.

An object of the present invention is to provide a coated metal sheet and an exterior building material that are chromate-free as well as have excellent flat-portion corrosion resistance.

Solution to Problem

The present inventors have intensively studied causes of the aforementioned corrosion in the flat portion. FIG. 2 is a micrograph of a corroded portion in the flat portion of a chromate-free coated metal sheet. In FIG. 2, portion A is a portion where silica particles as a gloss adjusting agent are exposed from the overcoat coating film, and portion B is a portion where the silica particles have fallen off from the overcoat coating film. FIG. 3 is a reflection electron micrograph of a cross section along line L, in FIG. 2, in portion A of the above-described coated metal sheet. FIG. 4 is a reflection electron micrograph of a cross section along line L, in FIG. 2, in portion B of the above-described coated metal sheet. FIG. 3 clearly shows the occurrence of cracks at the silica particles exposed on the surface of the overcoat coating film, and FIG. 4 clearly shows that corrosion of the metal sheet originates from the holes in the overcoat coating film from which the silica particles have fallen off.

As described above, the present inventors have confirmed that, when aggregated particles such as silica are used as the gloss adjusting agent, the corrosion occurs in a portion where the gloss adjusting agent in the overcoat coating film has cracked, collapsed, or fallen off, and also that the gloss adjusting agent exposed from the overcoat coating film to be worn in actual use cracks, collapses and falls off the overcoat coating film.

The present inventors have also investigated the gloss adjusting agent to thereby confirm that the silica specified by an average particle diameter contains particles considerably larger than the average particle diameter relative to the thickness of the overcoat coating film. For example, when observing, among commercially available silica to be used as the above-described gloss adjusting agent, silica having an average particle diameter of 3.3 μm with an electron microscope, the present inventors have confirmed that silica having a particle diameter of about 15 μm is contained (FIG. 5).

Similarly when aggregated particles such as silica, polyacrylonitrile (PAN) and the like are used as a matting agent to be additionally used in the overcoat coating film, the present inventors have also confirmed that corrosion originates in a portion where the matting agent exposed from the overcoat coating film has cracked, collapsed, or fallen off (FIG. 6 and FIG. 7).

Then, the present inventors, focusing on the fact that such aggregated particles having a large particle diameter decrease the corrosion resistance, have found that, by use of a gloss adjusting agent, which is aggregated particles having a specific particle diameter relative to the thickness of the overcoat coating film, and a matting agent, which is primary particles, corrosion resistance can be obtained equivalent to or greater than the corrosion resistance achieved by chromate-based chemical conversion treatment and by use of a chromium-containing anti-rust pigment in an undercoat coating film in conventional metal sheets, having completed the present invention.

Specifically, the present invention relates to a chromate-free coated metal sheet and an exterior building material.

[1] A coated metal sheet being chromate-free and including:
a metal sheet, and
an overcoat coating film to be disposed on the metal sheet,
wherein the overcoat coating film comprises a gloss adjusting agent which is particles having micropores and a matting agent which is primary particles,
wherein a content of the gloss adjusting agent in the overcoat coating film is 0.2 to 15 vol %,
wherein a content of the matting agent in the overcoat coating film is 0.2 to 15 vol %, and
wherein the coated metal sheet satisfies the following equations:

$$(R+2\sigma 1)/T \leq 0.7$$

$$R1 \geq 2.0$$

$$2.0 \leq (R2+2\sigma 2)/T \leq 7.0$$

$$13 \leq T \leq 20$$

wherein R1 (μm) is a number average particle diameter of the gloss adjusting agent, R2 (μm) is a number average particle diameter of the matting agent, T (μm) is a film thickness of the overcoat coating film, σ1 is a standard deviation of a number particle size distribution of the gloss adjusting agent, and σ2 is a standard deviation of a number particle size distribution of the matting agent.

[2] The coated metal sheet according to [1], further including an undercoat coating film between the metal sheet and the overcoat coating film.

[3] The coated metal sheet according to [1] or [2], wherein the coated metal sheet is a coated metal sheet for exterior use.

[4] An exterior building material composed of the coated metal sheet according to any one of [1] to [3].

Advantageous Effects of Invention

The present invention prevents exposure, cracking and the like of the gloss adjusting agent, and cracking, fall-off and the like of the matting agent, during the intended age of service. Accordingly, there is provided a coated metal sheet for exterior use, wherein the coated metal sheet is chromate-free as well as has excellent flat-portion corrosion resistance equivalent to or greater than that of coated metal sheets rust-prevented with chromium.

DESCRIPTION OF EMBODIMENTS

Figure 1:
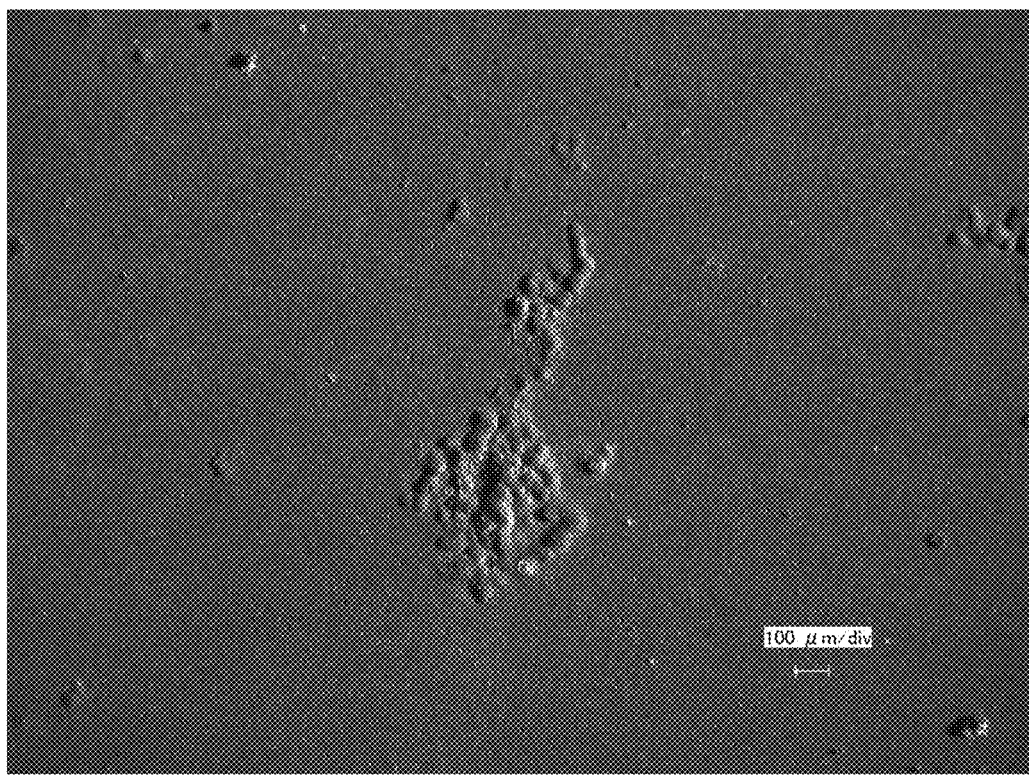
FIG. 1 is a micrograph of a corroded portion (coating film blistering) occurred in the flat portion of a chromate-free coated metal sheet in actual use of five years.
Figure 2:
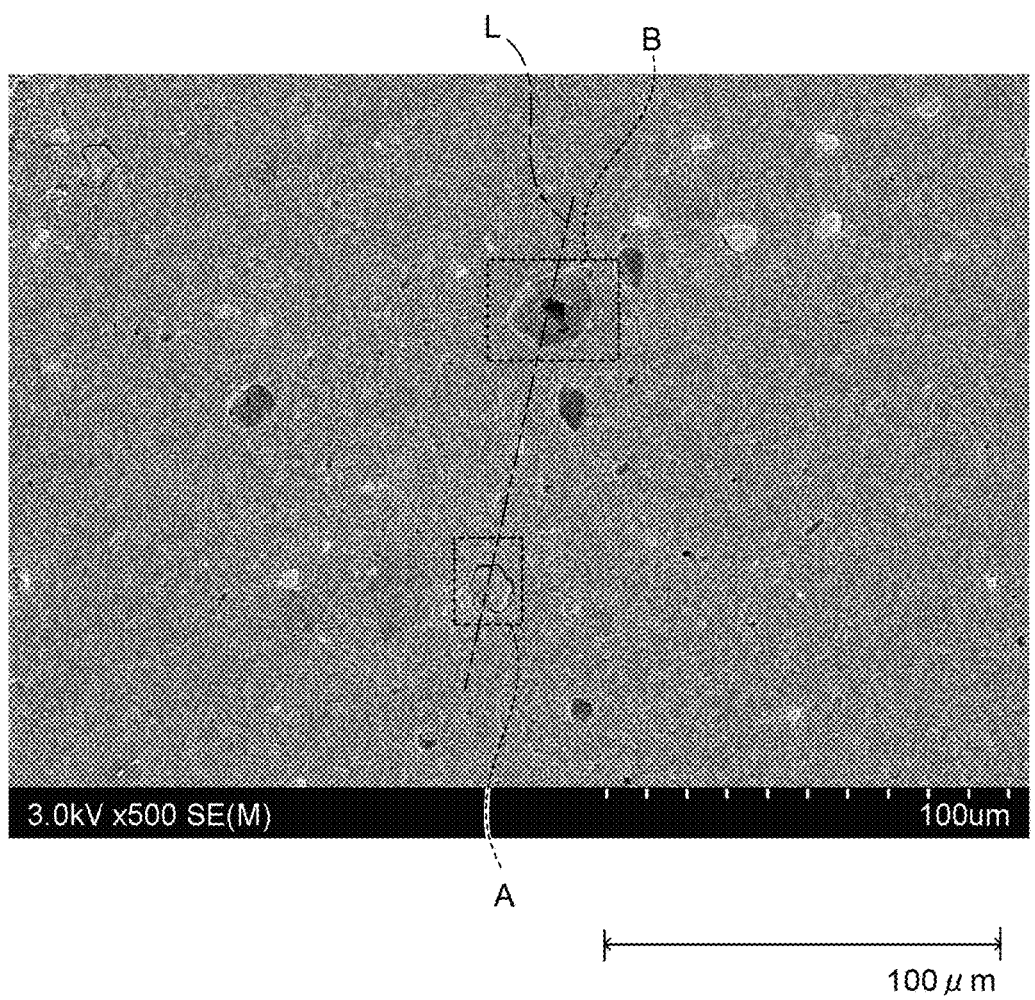
FIG. 2 is a micrograph of a corroded portion in the flat portion of a chromate-free coated metal sheet.
Figure 3:
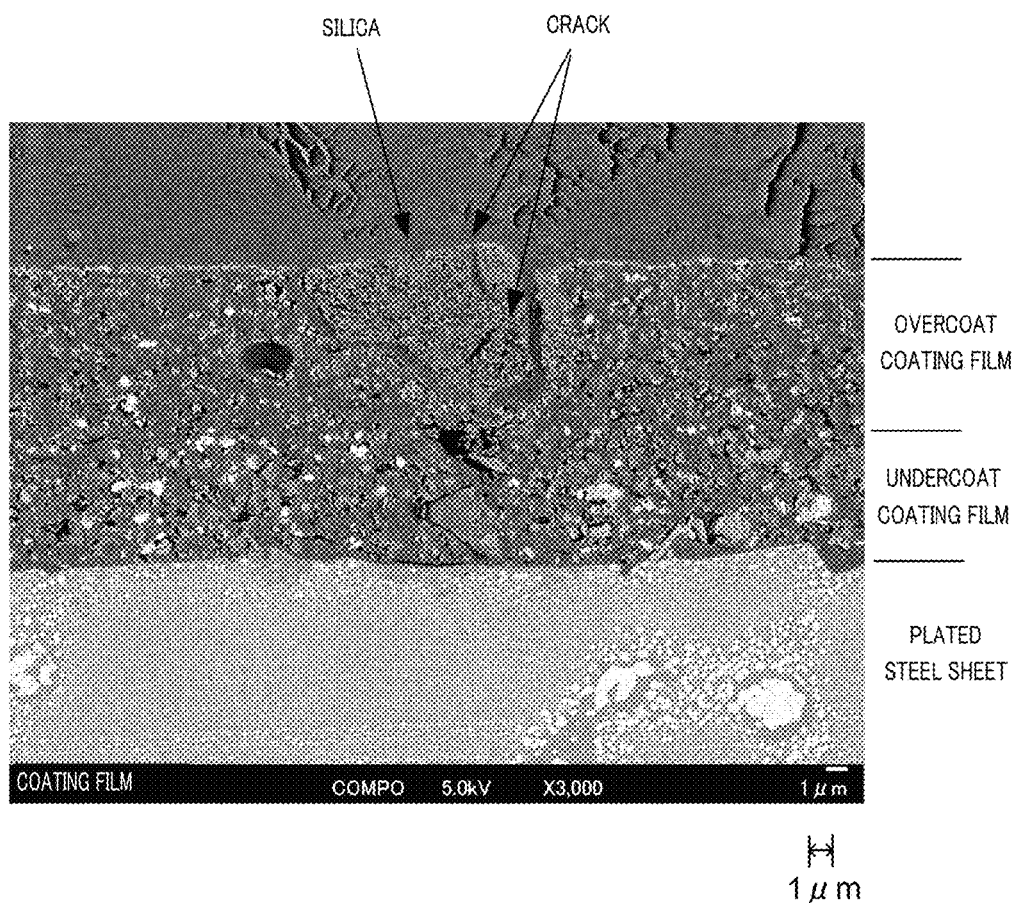
FIG. 3 is a reflection electron micrograph of a cross section along line L, in FIG. 2, in portion A of the coated metal sheet shown in FIG. 2.
Figure 4:
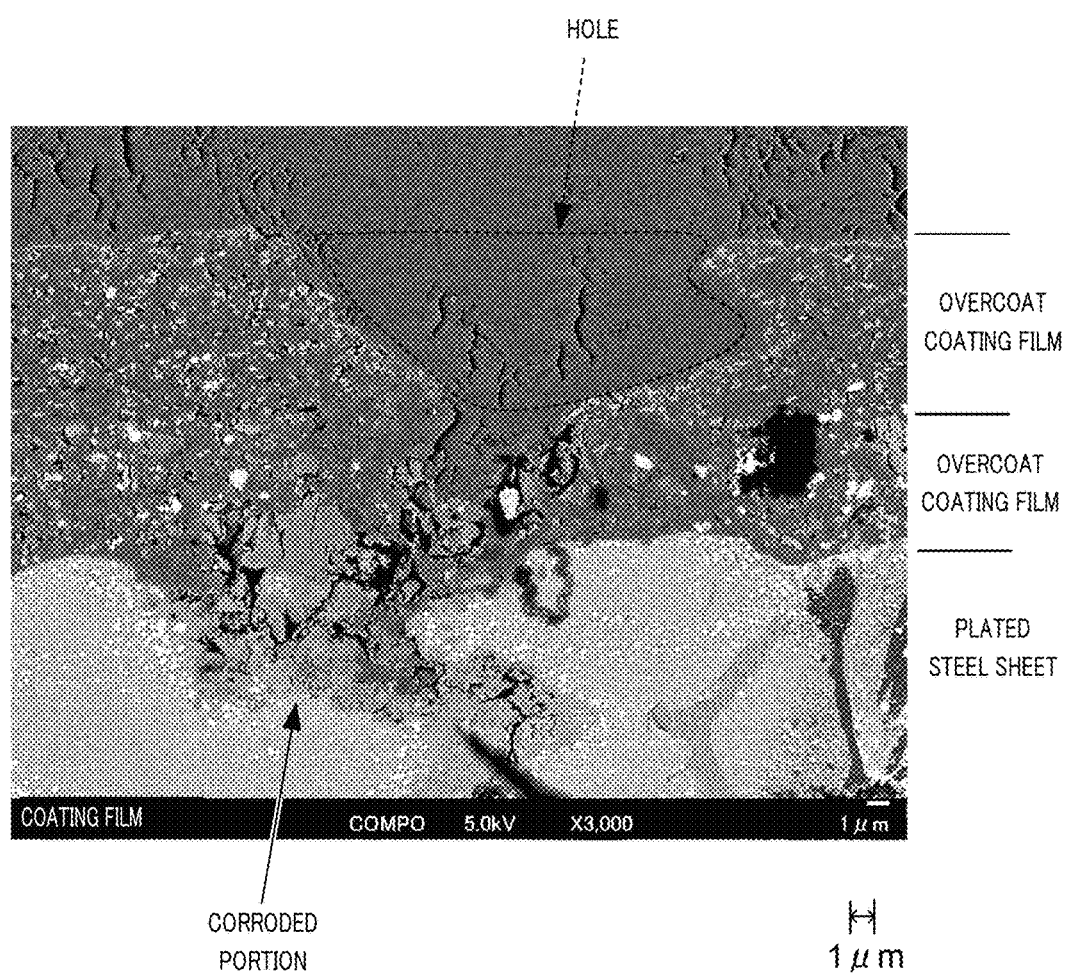
FIG. 4 is a reflection electron micrograph of a cross section along line L, in FIG. 2, in portion B of the coated metal sheet shown in FIG. 2.
Figure 5:
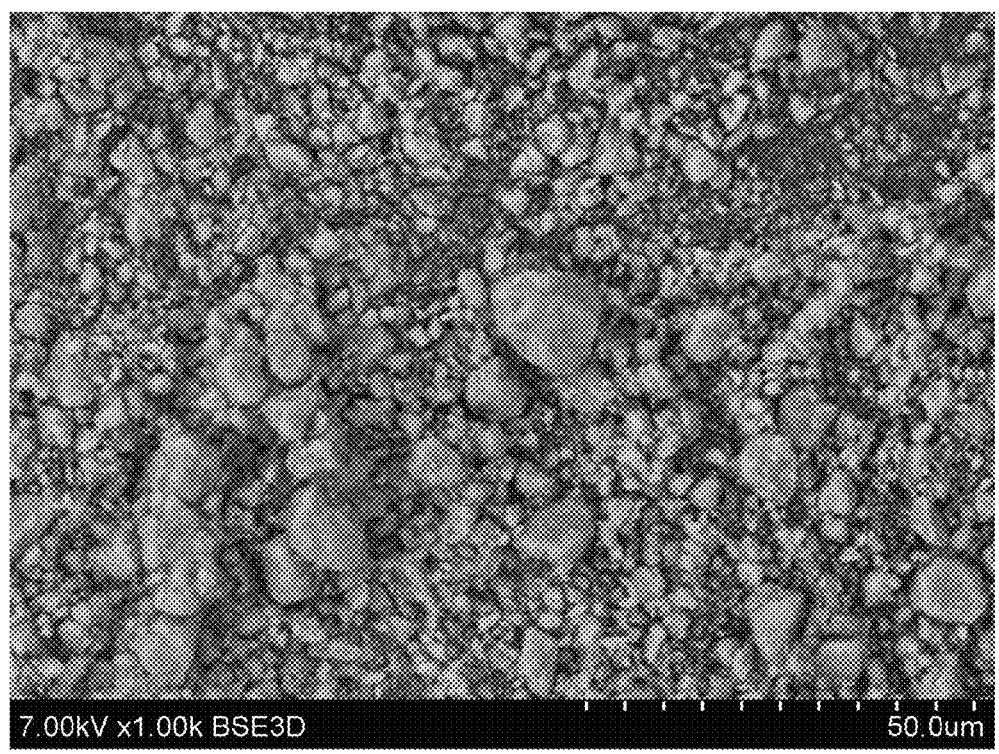
FIG. 5 is an electron micrograph of silica powder having an average particle diameter of 3.3 μm.
Figure 6:
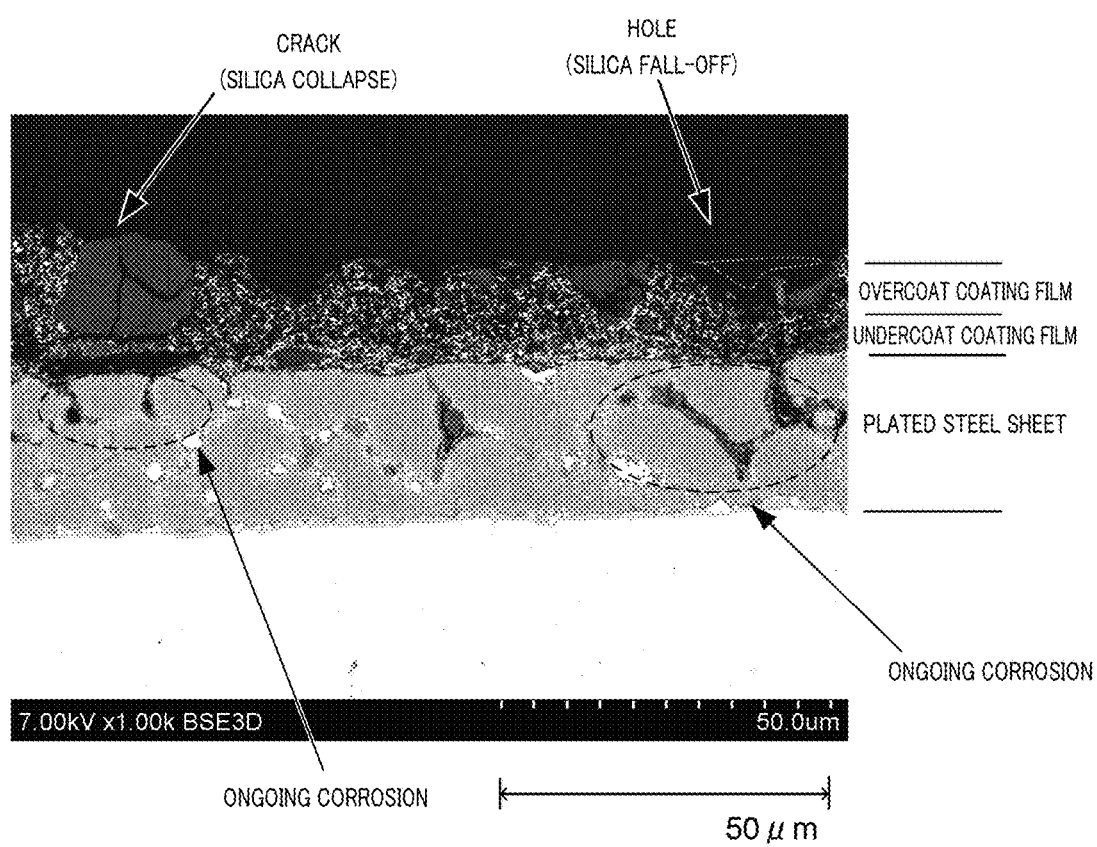
FIG. 6 is a micrograph of a cross section of a corroded portion in the flat portion of a chromate-free coated metal sheet in which silica particles are used as a matting agent.
Figure 7:
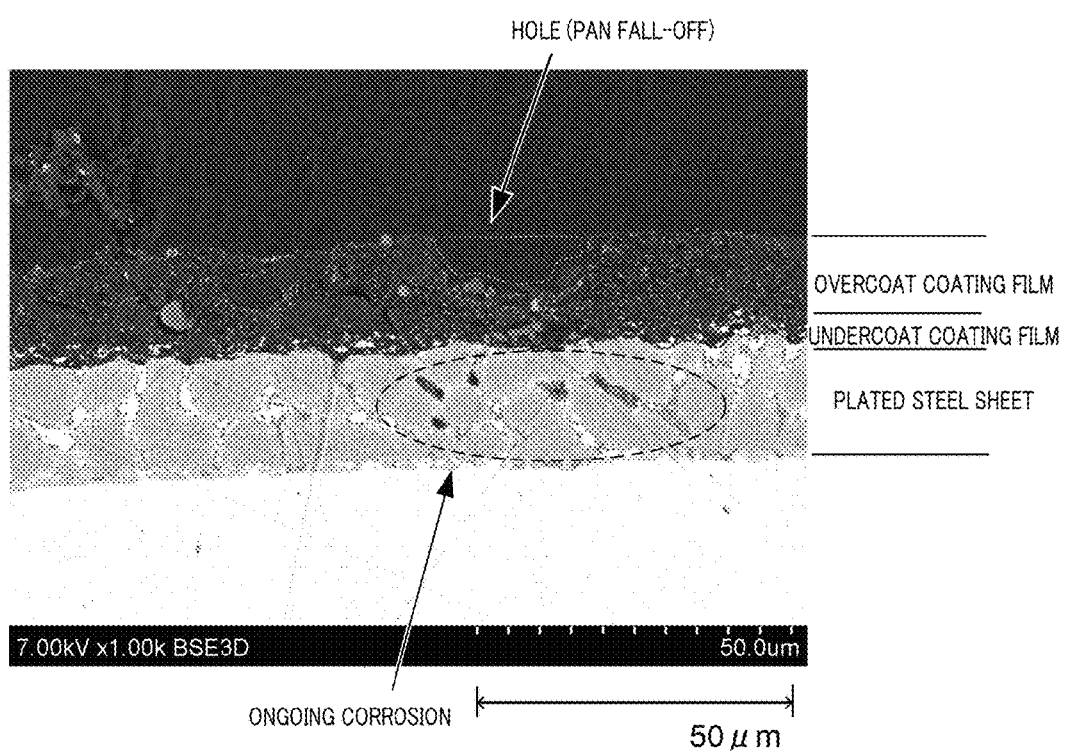
FIG. 7 is a micrograph of a cross section of a corroded portion in the flat portion of a chromate-free coated metal sheet in which PAN particles are used as a matting agent.

Hereinafter, the coated metal sheet according to one embodiment of the present invention will be described. The above-described coated metal sheet includes a metal sheet and an overcoat coating film to be disposed on the metal sheet.

The above-described metal sheet can be selected from known metal sheets in the range where the effect of the present embodiment can be achieved. Examples of the metal sheet include cold-rolled steel sheets, galvanized steel sheets, Zn—Al alloy-plated steel sheet, Zn—Al—Mg alloy-plated steel sheets, aluminum-plated steel sheets, stainless steel sheets (including austenitic, martensitic, ferritic, and ferrite-martensite two-phase systems), aluminum sheets, aluminum-alloy sheets, copper sheets and the like. The above-described metal sheets are preferably plated steel sheets from the viewpoint of corrosion resistance, lighter weight, and cost-effectiveness. The plated steel sheet is preferably hot-dip 55% Al—Zn alloy-plated steel sheets, Zn—Al—Mg alloy-plated steel sheets, or aluminum-plated steel sheets, particularly from the viewpoint of corrosion resistance and from the viewpoint of suitability for exterior building materials.

The above-described metal sheet preferably has a chemical conversion film on its surface, from the viewpoint of improving the adhesiveness of the coated metal sheet and the corrosion resistance. Examples of the chemical conversion film include Ti—Mo composite films, fluoro acid-based films, phosphate films, resin-based films, resin and silane coupling agent-based films, silica-based films, silica and silane coupling agent-based films, zirconium-based films, and zirconium and silane coupling agent-based films.

From the above-described viewpoint, the amount of the Ti—Mo composite film deposited is preferably 10 to 500 mg/m$^2$ in terms of total Ti and Mo, the amount of the fluoro acid film deposited is preferably 3 to 100 mg/m$^2$ in terms of fluorine or in terms of total elemental metals, and the amount of the phosphate film deposited is preferably 0.1 to 5 g/m$^2$ in terms of elemental phosphorous, in the above-described metal sheet.

The amount of the above-described resin-based film deposited is preferably 1 to 500 mg/m$^2$ in terms of the resin, the amount of the above-described resin and silane coupling agent-based film deposited is preferably 0.1 to 50 mg/m$^2$ in terms of Si, the amount of the above-described silica-based film deposited is preferably 0.1 to 200 mg/m$^2$ in terms of Si, the amount of the above-described silica and silane coupling agent-based film deposited is preferably 0.1 to 200 mg/m$^2$ in terms of Si, the amount of the above-described zirconium-based film deposited is preferably 0.1 to 100 mg/m$^2$ in terms of Zr, and the amount of the above-described zirconium and silane coupling agent-based film deposited is preferably is 0.1 to 100 mg/m$^2$ in terms of Zr.

The above-described chemical conversion film can be formed by applying an aqueous chemical conversion liquid for forming the film by a known method such as roll-coating, spin-coating, spraying methods and the like, to the above-described metal sheet surface and drying the above-described metal sheet after application without water washing.

The drying temperature and the drying time for the metal sheet are preferably 60 to 150° C. as the temperature which the metal sheet reaches and 2 to 10 seconds, for example, from the viewpoint of productivity.

The above-described overcoat coating film is usually composed of resin. The resin is selected as appropriate from the viewpoint of designability, weather resistance and the like. Examples of the resin include polyester, acrylic, urethane resins, and fluorine resins.

The film thickness T of the above-described overcoat coating film is 13 to 20 μm. An extremely large film thickness T of the overcoat coating film may be responsible for reduction in the productivity, increase in the production cost and the like, whereas, with an extremely small film thickness T, the intended designability and the intended durability may not be achieved. For example, in order to obtain a coated metal sheet that has good productivity, exhibits the intended gloss and coloring, and can be actually used as an exterior building material for at least 10 years, the film thickness T of the overcoat coating film is, for example, preferably 14 μm or more, more preferably 15 μm or more, from the above-described viewpoint. Also due to the above-described reason, the film thickness T of the overcoat coating film is preferably 19 μm or less, more preferably 18 μm or less. The film thickness T of the overcoat coating film is, for example, the average value of distances from the bottom to the surface at a plurality of positions on a portion where the matting agent of the overcoat coating film is not present.

The film thickness T of the above-described overcoat coating film is, from the viewpoint of the designability of the coated metal sheet, preferably larger when a color of the overcoat coating film is light, and can be smaller when the color of the overcoat coating film is dark. Although it depends on the case, for example, when the value L of the overcoat coating film is 80 or less, the film thickness T of the overcoat coating film can be 15 μm or less, and when the value L of the overcoat coating film is more than 80, the film thickness is preferably more than 15 μm.

Alternatively, the film thickness T of the above-described overcoat coating film can be smaller, as the color of the overcoat coating film is closer to the color of the surface of the steel sheet before the overcoat coating film is formed (for example, an undercoat coating film described below), from the viewpoint of the designability of the coated metal sheet. Although it depends on the case, for example, when absolute value ΔL of the difference between the value L of the overcoat coating film and the value L of the color of the surface of the steel sheet before the coating film is formed is 10 or less, the film thickness T of the overcoat coating film can be 13 μm or less, when ΔL is 20 or less, the film thickness T can be 15 μm or less, and when ΔL is 50 or less, the film thickness T can be 17 μm or less.

Incidentally, the above-described value L can be determined by calculation by the Hunter's color difference formula from the measurement result by a commercially available spectrophotometer (for example, manufactured by KONICA MINOLTA OPTICS, INC. "CM3700d").

The above-described overcoat coating film contains a gloss adjusting agent. The gloss adjusting agent is blended in the overcoat coating film to moderately roughen the surface of the overcoat coating film, imparting the intended appearance with gloss to the coated metal sheet. The gloss adjusting agent is also used to adjust variation of gloss among production lots.

The above-described gloss adjusting agent has a number average particle diameter R1 of 2.0 μm or more. When the gloss adjusting agent is extremely small, the gloss of the overcoat coating film is extremely high, and thus, the intended designability may not be achieved. As such, it is possible to determine the number average particle diameter of the gloss adjusting agent R1 as appropriate depending on the intended designability (glossiness) of the coated metal sheet in the range where R1 satisfies the formula described below. However, when R1 is extremely large, the roughness of the overcoat coating film increases, and thus the intended designability cannot be achieved. For example, in order to obtain a coated metal sheet having a glossiness at 75 degrees of 1 to 25 in addition to the flat-portion corrosion resistance, the number average particle diameter R1 of the gloss adjusting agent is 3 μm or more, 5 μm or more, or 7 μm or more, in the overcoat coating film. The number average particle diameter can be confirmed by observation of the cross-section of the overcoat coating film or can be measured by an image analyzing method and the Coulter method (for example, using an accurate particle sizing and counting analyzer "Multisizer 4" manufactured by Beckman Coulter Inc.).

The content of the above-described gloss adjusting agent in the above-described overcoat coating film is 0.2 to 15 vol %. When the content is extremely high, the gloss of the overcoat coating film becomes extremely low, and also, the processed-part adhesiveness decreases. When the content is extremely low, the gloss cannot be controlled. Thus, even if the content is extremely large or small, the intended designability may not be achieved. For example, in order to obtain a coated metal sheet having a glossiness at 75 degrees of 1 to 25, the content of the gloss adjusting agent in the overcoat coating film is preferably 0.4 vol % or more, more preferably 0.6 vol % or more. Also due to the above-described reason, the content of the gloss adjusting agent in the overcoat coating film is preferably 13 vol % or less, more preferably 11 vol % or less. The content can be confirmed by measurement of the ash content in the overcoat coating film, collection of the gloss adjusting agent by dissolution of the overcoat coating film, image analysis of a cross-sectional image of element discrimination conducted at a plurality of points or the like.

The above-described gloss adjusting agent is particles having micropores (hereinafter, may be referred to as "microporous particles"). Examples of the microporous particles include aggregates formed by chemical bonding of primary particles, agglomerates formed by physical bonding of primary particles, and porous particles. The porous particles have a porous structure at least inside the particles. The above-described gloss adjusting agent may be composed solely of the above-described microporous particles or may contain particles other than microporous particles. The microporous particles may be inorganic particles or organic particles, and can be selected from known microporous particles used as a gloss adjusting agent, in the range where the particles satisfy the equation described below. Specific examples of the materials of the microporous particles include silica, calcium carbonate, barium sulfate, polyacrylonitrile, and calcium carbonate-calcium phosphate composites.

The above-described coated metal sheet satisfies the following equation:

$$(R1+2\sigma 1)/T \leq 0.7$$

wherein R1 (μm) is the number average particle diameter of the above-described gloss adjusting agent, T (μm) is the film thickness of the above-described overcoat coating film, and σ1 is the standard deviation of the number particle size distribution of the above-described gloss adjusting agent.

When the number particle size distribution of the above-described gloss adjusting agent is the normal distribution, R1+2σ1 represents the maximum value of the particle diameter of about 95.45% of the particles having a particle diameter larger than the number average particle diameter R1. In this manner, R1+2σ1 represents the substantially maximum value of the particle diameter of the above-described gloss adjusting agent. With extremely large (R1+2σ1)/T, the intended flat portion-corrosion resistance may not be achieved when the above-described microporous particles is exposed due to wearing of the overcoat coating film during actual use. With extremely small (R1+2σ1)/T, the intended glossiness may not be achieved. For example, in order to obtain a coated metal sheet having an actual age of service as an exterior building material of at least 10 years or more and a glossiness at 75 degrees of 1 to 25, (R1+2σ1)/T is preferably 0.3 or more, more preferably 0.4 or more. Also, due to the above-described reason, (R1+2σ1)/T is preferably 0.6 or less, more preferably 0.5 or less. R1 and σ1 can be determined from the number particle size distribution of the above-described gloss adjusting agent.

The above-described gloss adjusting agent may be composed of sufficiently small particles relative to the film thickness T of the overcoat coating film when in the range satisfying the above-described equation. From the viewpoint of preventing early exposure of the gloss adjusting agent from the overcoat coating film, the maximum value of the particle diameter in the number particle size distribution of the gloss adjusting agent is preferably less than the film thickness of the overcoat coating film T, more preferably 0.7 T or less, still more preferably 0.6 T or less. The gloss adjusting agent having the above-described particle size distribution including the maximum value can be selected from commercially-available products, or can be adjusted by the following classification or the like.

The above-described gloss adjusting agent may be subjected to classification to sharpen the particle size distribution of the gloss adjusting agent, treatment to remove coarse particles in the gloss adjusting agent or the like, from the viewpoint of preventing wearing by its exposure from the overcoat coating film during actual use of the exterior building material. The above-described classification is conducted with, for example, a sieve, a forced vortex-type centrifugal precision air classifier or the like. Treatment for cutting the above-described coarse particles can be conducted by a known method to separate and remove the above-described coarse particles having a particle diameter of 0.3 T to 0.7 T, or a known method to pulverize the coarse particles.

The above-described overcoat coating film also contain a matting agent. The above-described matting agent is blended to the overcoat coating film in order to exhibit unevenness that is larger than the coarseness to be imparted by a gloss adjusting agent to the overcoat coating film and can be visually confirmed and to impart a texture, providing the coated metal sheet with the intended appearance. The matting agent also includes those having a particle diameter larger than the overcoat coating film, and thus can prevent the overcoat coating film from being scratched. Thereby, the scratch resistance of the coated metal sheet can be improved.

Although the number average particle diameter of the above-described matting agent R2 is not particularly limited, the matting agent having an extremely small particle diameter cannot reduce the gloss of the overcoat coating film, and the intended designability may not be achieved. It is possible to determine the number average particle diameter of the matting agent R2 as appropriate depending on the intended designability (glossiness) of the coated metal sheet in the range where R2 satisfies the equation described below. However, when R2 is extremely large, the matting agent causes streaks on coating, and the intended designability may not be achieved. For example, in order to obtain a coated metal sheet having a glossiness at 75 degrees of 1 to 25 in addition to flat-portion corrosion resistance, the number average particle diameter of the matting agent R2 is preferably 20 μm or more, more preferably 25 μm or more. Also, due to the above-described reason, the number average particle diameter of the matting agent R2 is preferably 75 μm or less, more preferably 50 μm or less, still more preferably 40 μm or less. The number average particle diameter can be confirmed by observation of the cross-section of the overcoat coating film or can be measured by an image analyzing method and the Coulter method (for example, using an accurate particle sizing and counting analyzer "Multisizer 4" manufactured by Beckman Coulter Inc.).

The content of the above-described matting agent in the above-described overcoat coating film is 0.2 to 15 vol %. When the content is extremely high, the gloss of the overcoat coating film decreases, and also, the processed-part adhesiveness decreases. In contrast, when the content is extremely low, gloss cannot be adjusted, and in both cases, the intended designability may not be achieved. For example, in order to obtain a coated metal sheet having a glossiness at 75 degrees of 1 to 25, the content of the matting agent in the overcoat coating film is preferably 0.4 vol % or more, more preferably 0.6 vol % or more. Also due to the above-described reason, the content of the matting agent in the overcoat coating film is preferably 13 vol % or less, more preferably 10 vol % or less. The content can be confirmed by measurement of the ash content in the overcoat coating film, collection of the matting agent by dissolution of the overcoat coating film, image analysis of a cross-sectional image of element discrimination conducted at a plurality of points or the like.

The above-described matting agent is primary particles. The primary particles refer to particles having no micropores that may cause the particles to collapse when the substance (for example, water) present in their voids expands. The primary particles may be resin particles or inorganic particles, and can be selected from known primary particles used as a matting agent, in the range where the particles satisfy the equation described below. Specific examples of the primary particles include primary particles composed of resin such as acrylic resin, polyurethane resin, polyester resin, melamine resin, urea resin, polyamide resin and the like (resin particles); and primary particles composed of an inorganic compound such as glass, silicon carbide, boron nitride, zirconia, alumina, silica, and the like (inorganic particles). The shape of these primary particles is preferably approximately spherical, but may be other shape such as a cylindrical shape, a disc shape and the like. Also, recesses and the like may be present on the surface of the primary particles unless they are micropores that may become an origin of collapse of the particles.

The above-described coated metal sheet satisfies the following equation:

$$2.0 \leq (R2+2\sigma2)/T \leq 7.0$$

wherein R2 (μm) is the number average particle diameter of the above-described matting agent, T (μm) is the film thickness of the above-described overcoat coating film, and σ2 is the standard deviation of the number particle size distribution of the above-described matting agent.

When the number particle size distribution of the above-described matting agent is the normal distribution, R2+2σ2 represents the maximum value of the particle diameter of about 95.45% of the particles having a particle diameter larger than the number average particle diameter R2. In this manner, R2+2σ2 represents the substantially maximum value of the particle diameter of the above-described matting agent. When (R2+2σ2)/T is extremely large, streaks or the like attributable to the matting agent occur on coating of the overcoat coating film, and a fair coating appearance may not be achieved. When (R2+2σ2)/T is extremely small, the intended texture may not be achieved. For example, in order to obtain a coated metal sheet having a glossiness at 75 degrees of 1 to 25, in an overcoat coating film having an actual age of service as an exterior building material of at least 10 years or more and containing a gloss adjusting agent and a matting agent, (R2+2σ2)/T is preferably 3 or more, more preferably 4 or more. Also, due to the above-described reason, (R2+2σ2)/T is preferably 6 or less, more preferably 5 or less. R2 and σ2 can be determined from the number particle size distribution of the above-described matting agent.

The above-described overcoat coating film may further contain other ingredients besides the resin, gloss adjusting agent, and matting agent aforementioned, in the range where the effect of the present embodiment can be achieved. For example, the overcoat coating film may further contain a colorant. Examples of the colorant include inorganic pigments such as titanium oxide, calcium carbonate, carbon black, iron black, iron oxide yellow, titanium yellow, colcothar, iron blue, cobalt blue, cerulean blue, ultramarine blue, cobalt green, molybdenum red and the like; composite oxide calcined pigments containing metal components such as CoAl, CoCrAl, CoCrZnMgAl, CoNiZnTi, CoCrZnTi, NiSbTi, CrSbTi, FeCrZnNi, MnSbTi, FeCr, FeCrNi, FeNi, FeCrNiMn, CoCr, Mn, Co, SnZnTi and the like; metallic pigments such as Al, resin-coated Al, Ni and the like; and organic pigments such as Quinacridone Red, Lithol Red B, Brilliant Scarlet G, Pigment Scarlet 3B, Brilliant Carmine 6B, Lake Red C, Lake Red D, Permanent Red 4R, Bordeaux 10B, Fast Yellow G, Fast Yellow 10G, Pare Red, Watching Red, Benzidine Yellow, Benzidine Orange, Bon Maroon L, Bon Maroon M, Brilliant Fast Scarlet, Vermilion Red, Phthalocyanine Blue, Phthalocyanine Green, Fast Skyblue, Aniline Black and the like. The above-described colorant is sufficiently smaller relative to the above-described gloss adjusting agent, and, for example, the number average particle diameter of the above-described colorant is 0.01 to 1.5 μm. The content of the colorant in the overcoat coating film is, for example, 2 to 20 vol %.

The above-described overcoat coating film may further contain an extender pigment. Examples of the extender pigment include barium sulfate, titanium oxide and the like. The above-described extender pigment is sufficiently smaller relative to the above-described gloss adjusting agent, and, for example, the number average particle diameter of the above-described extender pigment is 0.01 to 1 μm. The content of the extender pigment in the overcoat coating film is, for example, 0.1 to 15 vol %.

The above-described overcoat coating film may further contain a lubricant, from the viewpoint of preventing the occurrence of galling in the overcoat coating film on processing the coated metal sheet. Example of the lubricant include organic waxes such as fluorine-based wax, polyethylene-based wax, styrene-based wax, polypropylene-based wax and the like, and inorganic lubricants such as molybdenum disulfide, talc and the like. The content of the lubricant in the overcoat coating film is, for example, 0 to 10 vol %.

The above-described overcoat coating film is produced by a known method that includes applying a coating material for overcoat coating films to the surface of the above-described metal sheet, the surface of the undercoat coating film described below or the like, drying the coating material, and curing the coating material as required. The coating material for overcoat coating films contains materials for the overcoat coating film aforementioned, and may further contain other ingredients besides the materials in the range where the effect of the present embodiment can be achieved.

For example, the coating material for overcoat coating films may further contain a curing agent. The above-described curing agent crosslinks the polyester or acrylic resin aforementioned on curing (baking) when the overcoat coating film is produced. The type of the curing agent can be selected from the crosslinking agent aforementioned and known curing agents as appropriate, depending on the type of the resin to be used, baking conditions and the like.

Examples of the above-described curing agent include melamine compounds, isocyanate compounds, combinations of a melamine compound and an isocyanate compound and the like. Examples of the melamine compound include imino group-type, methylol-imino group-type, methylol group-type, or complete alkyl group-type melamine compounds. The isocyanate compound may be any of aromatic, aliphatic, and alicyclic compounds, and examples include m-xylene diisocyanate, hexamethylene diisocyanate, naphthalene diisocyanate, isophorone diisocyanate, and block compounds of these.

The overcoat coating film may further contain a curing catalyst as appropriate in the range where the storage stability of the coating material for overcoat coating films is not affected. The content of the above-described curing agent in the overcoat coating film is for example, 10 to 30 vol %.

The overcoat coating film may also contain 10 vol % or less of an ultraviolet absorber (UVA), a light stabilizer (HALS) and the like as appropriate, from the viewpoint of further improving the weather resistance. Furthermore, the overcoat coating film may contain a hydrophilizing agent, for example, 30 vol % or more of a partially hydrolyzed condensate of tetraalkoxysilane or the like, from the viewpoint of prevention of rain streak stains.

The above-described coating material for overcoat coating films is prepared by, for example, dispersing the materials for the overcoat coating film aforementioned in a solvent. The coating material may contain a solvent, a crosslinking agent and the like. Examples of the above-described solvent include hydrocarbons such as toluene, xylene and the like; esters such as ethyl acetate, butyl acetate and the like; ethers such as cellosolve and the like; and ketones such as methyl isobutyl ketone, methyl ethyl ketone, isophorone, cyclohexanone and the like.

The above-described coating material for overcoat coating films is applied, for example, by a known method such as roll coating, curtain flow coating, spray coating, immersion coating and the like. The overcoat coating film is produced by heating a metal sheet to which a coating material for overcoat coating film has been applied such that the temperature of the metal sheet reaches 200 to 250° C. thereby baking the above-described coating material for overcoat coating films onto the metal sheet. The film thickness T of the overcoat coating film is adjusted as appropriate, depending on, for example, the amount of the above-described coating material coated.

Incidentally, as aforementioned, blending a matting agent into the overcoat coating film allows a unique design to be exhibited as well as can improve the scratch resistance of the coated metal sheet. In order to achieve both the designability and the scratch resistance, the overcoat coating film is preferably coated thicker than a coating film that contains a gloss adjusting agent only and contains no matting agent. Also, since the ratio of nonvolatile ingredients in the is the coating material increases by blending a matting agent into the overcoat coating film, the overcoat coating film can be coated thicker than a coating film that contains a gloss adjusting agent only and contains no matting agent.

The above-described coated metal sheet may have further components, in the range where the effect of the present embodiment can be exerted. For example, the above-described coated metal sheet preferably further has an undercoat coating film between the above-described metal sheet and the overcoat coating film, from the viewpoint of improving the adhesiveness and the corrosion resistance of the overcoat coating film in the coated metal sheet. The above-described undercoat coating film is disposed on the surface of the metal sheet, or, when the above-described chemical conversion film has been made, on the surface of the chemical conversion film.

The above-described undercoat coating film is composed of resin. Examples of the resin include epoxy resin, polyester, epoxy-modified polyester resin, acrylic resin, and phenoxy resin.

The above-described undercoat coating film may further contain an anti-rust pigment, a coloring pigment, a metallic pigment, an extender pigment or the like. Examples of the above-described anti-rust pigment include non-chromium-based anti-rust pigments such as modified silica, vanadates, magnesium hydrogenphosphate, magnesium phosphate, zinc phosphate, aluminum polyphosphate and the like. Example of the above-described coloring pigment include titanium oxide, carbon black, chromium oxide, iron oxide, colcothar, titanium yellow, cobalt blue, cobalt green, Aniline Black, and Phthalocyanine Blue. Example of the above-described metallic pigment include aluminum flakes (non-leafing type), bronze flakes, copper flakes, stainless steel flakes, and nickel flakes. Examples of the above-described extender pigment include barium sulfate, titanium oxide, silica, and calcium carbonate.

The content of the above-described pigment in the undercoat coating film can be determined as appropriate, in the range where the effect of the present embodiment can be achieved. For example, the content of the above-described anti-rust pigment in the above-described undercoat coating film is preferably, for example, 10 to 70 vol %.

The above-described undercoat coating film is produced by application of a coating material for undercoat coating films. The coating material may contain a solvent, a crosslinking agent and the like. Examples of the above-described solvent include hydrocarbons such as toluene xylene and the like; esters such as ethyl acetate, butyl acetate and the like; ethers such as cellosolve and the like; and ketones such as methyl isobutyl ketone, methyl ethyl ketone, isophorone, cyclohexanone and the like. Examples of the above-described crosslinking agent include melamine resin, isocyanate resin and the like for crosslinking the resin aforementioned. The coating material for undercoat coating films is prepared by homogeneously mixing and dispersing the materials aforementioned.

The coating material for undercoat coating films is applied by a known method such as roll coating, curtain flow coating, spray coating, immersion coating or the like to a metal sheet in an amount to be coated such that a dry film thickness of 1 to 10 μm, preferably 3 to 7 μm is obtained. A coating film of the coating material is produced by heating a metal sheet at, for example, 180 to 240° C., a temperature which the metal sheet achieves, thereby baking the film onto the metal sheet.

The coated metal sheet according to the present embodiment is a chromate-free coated metal sheet. "Chromate-free" means that the above-described coated metal sheet contains substantially no hexavalent chromium. It is possible to confirm that the above-described coated metal sheet is "chromate-free" as follows. For example, in any of the metal sheet, the chemical conversion film, the undercoat coating film, and the overcoat coating film aforementioned, four 50 mm×50 mm specimens are cut off from a metal sheet on which the overcoat coating film or the undercoat coating film has been produced singly, and the specimens are immersed in 100 mL of boiling pure water for 10 minutes. Then, when hexavalent chromium eluted in pure water is quantified by a concentration analysis method in compliance with JIS H8625, Annex 2. 4. 1, "Diphenylcarbazide Visual Colorimetric Method", the concentration shall be lower than the detection limit Hexavalent chromium is not eluted form the above-described coated metal sheet during actual use into the environment, and the above-described coated metal sheet exhibits sufficient corrosion resistance at its flat portion. Incidentally, a "flat portion" refers to a portion that is covered with the above-described overcoat coating film of the above-described metal sheet and has not been deformed by bending, drawing, bulging, embossing, roll-forming or the like.

Applications of the above-described coated metal sheet are suitable for exterior use. "For exterior use" refers to being used in portions exposed to the open air such as roofs, walls, accessories, signboards, outdoor-installed apparatuses and the like, wherein the portions may be irradiated with a sunbeam and its reflected light. Examples of the coated metal sheet for exterior use include coated metal sheets for exterior building materials and the like.

The above-described coated metal sheet is suitable for a matte coated metal sheet. Matte refers to glossiness at 75 degrees being 1 to 25. The above-described glossiness is adjusted with the average particle diameter of the gloss adjusting agent and matting agent, their contents in the overcoat coating film and the like.

In the above-described coated metal sheet, the above-described gloss adjusting agent (microporous particles) are included completely in the overcoat coating film. Also, the substantially maximum particle of the microporous particles is sufficiently smaller relative to the film thickness of the overcoat coating film. Thus, the above-described overcoat coating film can be designed such that the above-described microporous particles are not exposed within the intended age of service, even if the resin in the overcoat coating film is gradually worn from the surface of the overcoat coating film by actual use in an exterior application. Therefore, cracking and collapse of the above-described microporous particles and fall-off from the above-described overcoat coating film within the intended age of service are prevented, and corrosive factors such as rainwater and the like cannot reach the metal sheet during the intended age of service.

Meanwhile, in the above-described coated metal sheet, although the matting agent is covered with the resin constituting the overcoat coating film, at least a part of the particles in the matting agent is larger than the film thickness of a portion of the overcoat coating film where the matting agent is not contained. Thus, the matting agent may appear from the overcoat coating film when the resin in the overcoat coating film is gradually worn from the surface of the overcoat coating film by actual use in an exterior application, even during the intended age of service. In such a situation, if microporous particles as the matting agent are blended in the overcoat coating film, a portion of the overcoat coating film where the matting agent cracks, collapses, or falls off may become an origin of corrosion. Thus, primary particles are blended as the matting agent in the above-described coated metal sheet. Therefore, even if the above-described primary particles appear from the surface of the overcoat coating film by actual use in an exterior application, cracking and collapse as those occurring in microporous particles and fall-off from the above-described overcoat coating film are prevented, and corrosive factors such as rainwater cannot reach the metal sheet.

Thus, the above-described coated metal sheet is chromate-free as well as exhibits flat portion-corrosion resistance equivalent to or greater than that of coated metal sheets containing a chromate-based anti-rust component.

As clear from the above description, according to the present embodiment, there can be provided a coated metal sheet that is chromate-free as well as has excellent flat-portion corrosion resistance, wherein the coated metal sheet has a metal sheet and an overcoat coating film to be disposed on the metal sheet, wherein the overcoat coating film contains particles having micropores (microporous particles) as a gloss adjusting agent and primary particles as a matting agent, wherein the content of the above-described gloss adjusting agent in the above-described overcoat coating film is 0.2 to 15 vol %, and the content of the above-described matting agent in the above-described overcoat coating film is 0.2 to 15 vol %, and wherein the following equations are satisfied:

$(R1+2\sigma1)/T \leq 0.7$ $R1 \geq 2.0$ $2.0 \leq (R2+2\sigma2)/T \leq 7.0$ $13 \leq T \leq 20$ wherein R1 (μm) is the number average particle diameter of the gloss adjusting agent, R2 (μm) is the number average particle diameter of the matting agent, T (μm) is the film thickness of the above-described overcoat coating film, σ1 is the standard deviation of the number particle size distribution of the above-described microporous particles, and σ2 is the standard deviation of the number particle size distribution of the above-described primary particles.

Additionally, that the above-described coated metal sheet further has an undercoat coating film between the above-described metal sheet and the above-described overcoat coating film is further effective from the viewpoint of improving the adhesiveness and corrosion resistance of the overcoat coating film in the coated metal sheet.

Additionally, that the above-described coated metal sheet is a coated metal sheet for exterior use is further effective from the viewpoint of reducing a load due to elution of chromium during actual use on the environment.

An exterior building material composed of the above-described coated metal sheet is chromate-free as well as can exhibit excellent flat portion-corrosion resistance during actual use of 10 years or more.

The above-described coated metal sheet is formed into an exterior building material by known processing such as bending, drawing, bulging, embossing, roll-forming or the like. In this manner, the exterior building material is composed of the above-described coated metal sheet. The exterior building material may further include other structure in the range where the above-described effects can be achieved. For example, the above-described exterior building material may further have a structure to be subjected to appropriate installation during actual use of the exterior building material. Examples of such a structure include members to fix an exterior building material to a building, members to connect a plurality of exterior building materials, marks that show the direction of an exterior building material on mounting, foam sheets and foam layers to improve the thermal insulation properties and the like. These structures may be included in the coated metal sheet for exterior use aforementioned.

Hereinafter, the present invention will be described in more detail with reference to Examples, but the present invention is not limited by these Examples.

EXAMPLES

[Production of Coated Base Sheets 1 to 3]

A hot-dip 55% Al—Zn alloy-plated steel sheet having an amount deposited on both the sides of 150 g/m² was alkali-degreased, and "SURFCOAT NRC300NS" manufactured by Nippon Paint Co., Ltd. ("SURFCOAT" is a registered trademark of the company), which is a chromate treatment solution, at 20° C. was applied to the surface of the plated layer of the plated steel sheet, as pre-coating treatment. The plated steel sheet was dried at 100° C. without washing with water to thereby obtain a chromate-treated steel sheet having an amount deposited of 20 mg/m² in terms of chromium. Additionally, the following chromate-free treatment solution, instead of the above-described chromate treatment solution, was applied, and the plated steel sheet was dried at 100° C. without washing with water to thereby obtain a chromate-free chemical conversion steel sheet having an amount deposited of 10 mg/m² in terms of Ti.

| (Chromate-free treatment solution) | |
|---|---|
| Hexafluorotitanate | 55 g/L |
| Hexafluorozirconate | 10 g/L |
| Aminomethyl-substituted polyvinyl phenol | 72 g/L |
| Water | Balance |

To the surface of the above-described chromate-free chemical conversion steel sheet, the following undercoat coating material 1 based on epoxy resin was applied. The above-described chemical conversion steel sheet was heated such that the temperature of the above-described plated steel sheet reached 200° C. to thereby obtain chromate-free coated base sheet 1 that had undercoat coating film 1 having a chromate-free dry film thickness of 5 μm. Additionally, chromate-free coated base sheet 2 that had a chromate-free undercoat coating film 2 having a dry film thickness of 5 μm was obtained in the same manner as coated base sheet 1 except that the following undercoat coating material 2 was used instead of undercoat coating material 1. Furthermore, chromium-containing coated base sheet 3 that had a chromium-containing undercoat coating film 3 having a dry film thickness of 5 μm was obtained in the same manner as coated base sheet 1 except that the above-described chromate-treated steel sheet was used instead of the above-described chromate-free chemical conversion steel sheet and that the following undercoat coating material 3 was used instead of undercoat coating material 1 was used.

| (Undercoat coating material 1) | |
|---|---|
| Phosphate mixture | 15 vol % |
| Barium sulfate | 5 vol % |
| Silica | 1 vol % |
| Clear coating material | Balance |

| (Undercoat coating material 2) | |
|---|---|
| Calcium vanadate | 15 vol % |
| Barium sulfate | 5 vol % |
| Silica | 1 vol % |
| Clear coating material | Balance |

| (Undercoat coating material 3) | |
|---|---|
| Strontium chromate | 15 vol % |
| Barium sulfate | 5 vol % |
| Silica | 1 vol % |
| Clear coating material | Balance |

In the above-described undercoat coating materials 1 to 3, the above-described clear coating material is "NSC680" manufactured by Nippon Fine Coatings Co., Ltd. In the above-described undercoat coating material 1, the above-described phosphate mixture is a mixture of magnesium hydrogenphosphate, magnesium phosphate, zinc phosphate, and aluminum tripolyphosphate. Additionally, the above-described vol % is a proportion based on the solid content in the undercoat coating material.

[Preparation of Overcoat Coating Material]

Overcoat coating materials 1 to 3 having the following composition were prepared. The clear coating material described below in overcoat coating material 1 is "CA clear coating material" manufactured by Nippon Fine Coatings Co., Ltd., the clear coating material described below in overcoat coating material 2 is "QK clear coating material" manufactured by the company, and the clear coating material described below in overcoat coating material 3 is "NSC3300clear coating material" manufactured by the company. Carbon black is a coloring pigment. The vol % described below is a proportion based on the solid content in the overcoat coating material.

| (Overcoat coating material) | |
|---|---|
| Carbon black | 7 vol % |
| Gloss adjusting agent (the type and the amount blended are shown in Tables 1 to 3) | |
| Matting agent (the type and the amount blended are shown in Tables 1 to 3) | |
| Clear coating material | Balance |

[Production of Coated Metal Sheets 1 to 13]

Overcoat coating material 1, prepared by blending 0.2 vol % of silica particles A' (silica A') ("'" indicates that the silica has been classified) as the gloss adjusting agent and 5 vol % of acrylic particles A (acrylic A) as the matting agent, was applied to the surface of undercoat coating film 1 of coated base sheet 1. The coated base sheet 1 was heated such that the temperature of the above-described plated steel sheet in coated base sheet 1 reached 220° C. to thereby produce an overcoat coating film having a dry film thickness T of 15 μm. Coated metal sheet 1 was thus produced.

Silica particles A' are powder prepared by cutting particles having a particle diameter of 0.3 T or more from "NIPGEL AZ-400" manufactured by Tosoh Silica Corporation ("NIPGEL is a registered trademark of the company) with a forced vortex-type centrifugal precision air classifier. "NIPGEL AZ-400", which has been produced by a wet gel method, corresponds to the aforementioned microporous particles. As determined with "Multisizer 4" manufactured by Beckman Coulter Inc. using an aperture tube having a diameter of 50 μm, when the film thickness T was 15 μm, the silica particles A' have an average particle diameter R1 of 2.5 μm, the standard deviation σ1 being 1.0 μm.

Acrylic particles A used were "TAFTIC AR-650MX" manufactured by Toyobo Co., Ltd. ("TAFTIC" is a registered trademark of the company.). "TAFTIC AR-650MX", which has been produced by suspension polymerization, corresponds to the aforementioned primary particles. As determined with "Multisizer 4" manufactured by Beckman Coulter Inc. using an aperture tube having a diameter of 50 μm, acrylic particles A have an average particle diameter R2 of 40 μm, the standard deviation σ2 being 4 μm.

Coated metal sheets 2 to 4 were each produced in the same manner as coated metal sheet 1 except that the amount of silica particles A' blended was changed as shown in Table 1. Coated metal sheets 5 to 7 were each produced in the same manner as coated metal sheet 1 except that the amount of acrylic particles A blended was changed as shown in Table 1. Additionally, coated metal sheets 8 to 10 were each produced in the same manner as coated metal sheet 2 except that the dry film thickness T was changed as shown in Table 1. When the film thickness T is 13 μm, silica particles A' have an average particle diameter R1 of 2.2 μm, the standard deviation σ1 being 0.9 μm. When the film thickness T is 17 μm, silica particles A' have an average particle diameter R1 of 2.8 μm, the standard deviation σ1 being 1.1 μm. When the film thickness T is 20 μm, silica particles A' have an average particle diameter R1 of 3.0 μm, the standard deviation σ1 being 1.5 μm. Additionally, coated metal sheet 11 was produced in the same manner as coated metal sheet 2 except that the type of the coated base sheet was changed as shown in Table 1. Furthermore, coated metal sheets 12 and 13 were each produced in the same manner as coated metal sheet 2 except that the type of the overcoat coating material was changed as shown in Table 1.

Incidentally, coated metal sheet 2 was cut to allow its cross section to be exposed. The cross section was placed inside a mass of epoxy resin, further ground the above described cross section, and photographed with a scanning electron microscope. The resulting image of a plurality of spots was processed and analyzed to determine the particle size distribution of silica particles A' and acrylic particles A. R1, σ1, R2, and σ2 were confirmed to be substantially equivalent to the above-described numerical values.

[Production of Coated Metal Sheets 14 to 26]

Coated metal sheet 14 was produced in the same manner as coated metal sheet 1 except that overcoat coating material 1 to which 0.2 vol % of silica particles B'(silica B') was blended as the gloss adjusting agent was used.

Silica particles B' are powder prepared by cutting particles having a particle diameter of 0.2 T or more from "Sylysia 300P" manufactured by Fuji Silysia Chemical Ltd. with a forced vortex-type centrifugal precision air classifier. "Sylysia 300P", which has been produced by a wet gel method, corresponds to the aforementioned microporous particles. When the film thickness T is 15 μm, silica particles B' have an average particle diameter R1 of 2 μm, the standard deviation σ1 being 0.5 μm.

Coated metal sheets 15 to 17 were each produced in the same manner as coated metal sheet 14 except that the amount of silica particles B' blended was changed as shown in Table 1. Additionally, coated metal sheets 18 to 20 were each produced in the same manner as coated metal sheet 15 except that the amount of acrylic particles A blended was changed as shown in Table 1. Additionally, coated metal sheets 21 to 23 were each produced in the same manner as coated metal sheet 15 except that the dry film thickness T was changed as shown in Table 1. When the film thickness T is 13 μm, silica particles B' have an average particle diameter R1 of 1.9 μm, the standard deviation σ1 being 0.4 μm. When the film thickness T is 17 μm, silica particles B' have an average particle diameter R1 of 2.1 μm, the standard deviation σ1 being 0.7 μm. When the film thickness T is 20 μm, silica particles B' have an average particle diameter R1 of 2.2 μm, the standard deviation σ1 being 0.8 μm. Additionally, coated metal sheet 24 was produced in the same manner as coated metal sheet 15 except that the type of the coated base sheet was changed as shown in Table 2. Furthermore, coated metal sheets 25 and 26 were each produced in the same manner as coated metal sheet 15 except that the type of the overcoat coating material was changed as shown in Table 2.

[Production of Coated Metal Sheets 27 to 32]

Coated metal sheet 27 was produced in the same manner as coated metal sheet 15 except that silica particles C' (silica C') were used as the gloss adjusting agent instead of silica particles B'. Silica particles C' are powder prepared by cutting particles having a particle diameter of 0.5 T or more from "NIPGEL AZ-410" manufactured by Tosoh Silica Corporation with a forced vortex-type centrifugal precision air classifier. "NIPGEL AZ-410", which has been produced by a wet gel method followed by treatment with inorganic material, corresponds to the aforementioned microporous particles. When the film thickness T is 15 μm, silica particles C' have an average particle diameter R1 of 3.5 μm, the standard deviation σ1 being 2.2 μm.

Additionally, coated metal sheet 28 was produced in the same manner as coated metal sheet 15 except that silica particles D' (silica D') were used as the gloss adjusting agent instead of silica particles B'. Silica particles D' are powder prepared by cutting particles having a particle diameter of 0.5 T or more from "NIPGEL AZ-460" manufactured by Tosoh Silica Corporation with a forced vortex-type centrifugal precision air classifier. "NIPGEL AZ-460", which has been produced by a wet gel method followed by treatment with organic material, corresponds to the aforementioned microporous particles. When the film thickness T is 15 μm, silica particles D' have an average particle diameter R1 of 3.7 μm, the standard deviation σ1 being 2.1 μm.

Additionally, coated metal sheet 29 was produced in the same manner as coated metal sheet 15 except that silica particles E' (silica E') were used as the gloss adjusting agent instead of silica particles B'. Silica particles E' are powder prepared by cutting particles having a particle diameter of 0.7 T or more from "ACEMATT TS 100" manufactured by NIPPON AEROSIL CO., LTD. ("ACEMATT" is a registered trademark of Evonik Degussa GmbH) with a forced vortex-type centrifugal precision air classifier. "ACE-MATTS 100", which has been produced by a dry combustion method, corresponds to the aforementioned microporous particles. When the film thickness T is 13 μm, silica particles E' have an average particle diameter R1 of 7.9 μm, the standard deviation σ1 being 0.6 μm.

Additionally, coated metal sheet 30 was produced in the same manner as coated metal sheet 15 except that silica particles F (silica F) were used as the gloss adjusting agent instead of silica particles B'. Silica particles F are powder prepared by cutting particles having a particle diameter of 0.7 T or more from "ACEMATT 3300" manufactured by NIPPON AEROSIL CO., LTD. with a forced vortex-type centrifugal precision air classifier. "ACEMATT 3300", which has been produced by a dry combustion method followed by treatment with organic material, corresponds to the aforementioned microporous particles. When the film thickness T is 13 μm, silica particles F' have an average particle diameter R1 of 7.5 μm, the standard deviation σ1 being 0.8 μm.

Additionally, coated metal sheet 31 was produced in the same manner as coated metal sheet 2 except that overcoat coating material 1 to which 5 vol % of polyacrylonitrile particles A' (PAN A') was blended as the gloss adjusting agent was used.

PAN particles A' are powder prepared by cutting particles having a particle diameter of 0.4 T or more from "TAFTIC ASF-7" manufactured by Toyobo Co., Ltd. with a forced vortex-type centrifugal precision air classifier. "TAFTIC ASF-7", which has been produced by pulverizing particles prepared by a spray dry method, corresponds to the aforementioned microporous particles. When the film thickness T is 15 μm, PAN particles A' have an average particle diameter R1 of 5 μm, the standard deviation σ1 being 0.6 μm.

Additionally, coated metal sheet 32 was produced in the same manner as coated metal sheet 2 except that overcoat coating material 1 to which 5 vol % of calcium carbonate-calcium phosphate composite particles A' (CaCPC A') was blended as the gloss adjusting agent was used.

CaCPC particles A' are powder prepared by cutting particles having a particle diameter of 0.4 T or more from "Poronex" manufactured by MARUO CALCIUM CO., LTD. ("Poronex" is a registered trademark of the company) with a forced vortex-type centrifugal precision air classifier. "Poronex", which has a petal-like porous structure, corresponds to the aforementioned microporous particles. When the film thickness T is 15 μm, CaCPC particles A' have an average particle diameter R1 of 5 μm, the standard deviation σ1 being 0.5 μm.

[Production of Coated Metal Sheets 33 to 36]

Coated metal sheet 33 was produced in the same manner as coated metal sheet 15 except that urethane particles (urethane) were used as the matting agent instead of acrylic particles A. The urethane particles used were "Art Pearl C-200" manufactured by Negami Chemical Industrial Co., Ltd. ("Art Pearl" is a registered trademark of the company.). "Art Pearl C-200", which has been produced by suspension polymerization, corresponds to the aforementioned primary particles. As determined with "Multisizer 4" manufactured by Beckman Coulter Inc. using an aperture tube having a diameter of 50 μm, the urethane particles have an average particle diameter R2 of 30 μm, the standard deviation σ2 being 3 μm.

Additionally, coated metal sheet 34 was produced in the same manner as coated metal sheet 33 except that glass particles (glass) were used as the matting agent instead of the urethane particles. The glass particles used were "EGB731" manufactured by Potters-Ballotini Co., Ltd. "EGB731" corresponds to the aforementioned primary particles. As determined with "Multisizer 4" manufactured by Beckman Coulter Inc. using an aperture tube having a diameter of 50 μm, the glass particles have an average particle diameter R2 of 20 μm, the standard deviation σ2 being 5 μm.

Additionally, coated metal sheet 35 was produced in the same manner as coated metal sheet 33 except that acrylic particles B (acrylic B) was used as the matting agent instead of the urethane particles. Acrylic particles B used were "TAFTIC AR650MZ" manufactured by Toyobo Co., Ltd. As determined with "Multisizer 4" manufactured by Beckman Coulter Inc. using an aperture tube having a diameter of 50 μm, acrylic particles B have an average particle diameter R2 of 60 μm, the standard deviation σ2 being 5 μm.

Additionally, coated metal sheet 36 was produced in the same manner as coated metal sheet 33 except that acrylic particles C (acrylic C) were used as the matting agent instead of the urethane particles. Acrylic particles C used were "TAFTIC AR650ML" manufactured by Toyobo Co., Ltd. "TAFTIC AR650ML", which has been produced by suspension polymerization, corresponds to the aforementioned primary particles. As determined with "Multisizer 4" manufactured by Beckman Coulter Inc. using an aperture tube having a diameter of 50 μm, acrylic particles C have an average particle diameter R2 of 75 μm, the standard deviation σ2 being 15 μm.

[Production of Coated Metal Sheets 37 to 43]

Coated metal sheet 37 was produced in the same manner as coated metal sheet 1 except that silica particles G (silica G), which were prepared by the method described below, were used as the gloss adjusting agent instead of silica particles A'.

The method for preparing silica particles G will be described. First, into a reaction vessel equipped with a stirrer, 100 g of commercially available No. 3 sodium silicate ($SiO_2$: 21.9 mass %, $Na_2O$: 7.1 mass %, $SiO_2$/$Na_2O$=3.19) (7 mass % as the $SiO_2$ concentration in the total amount of the solution) was weighed. After addition of 100 g of water, to the solution adjusted to 50° C., 65 g of an acrylamide polymer aqueous solution (10 mass % aqueous solution, weight average molecular weight: 500,000) was slowly added under stirring and sufficiently dispersed. The amount of the aqueous solution added is an amount such that polyacrylamide anhydride reaches 30 mass % relative to $SiO_2$.

Subsequently, to the above-described mixed solution, 5 mass % sulfuric acid adjusted to 50° C. in advance was added, and the pH of the mixed solution was adjusted to 10. Then, stirring was stopped, and the mixed solution was left to stand as it was for 100 hours. Thereafter, the solution was stirred and dispersed, and the precipitate was filtered from the mother liquid. The resulting cake was redispersed in water. After sufficient dispersion, 5 mass % sulfuric acid was added to the solution until the pH reached 2.0. When the pH of the dispersion solution was substantially stabilized at 2.0, stirring was continued for 24 hours. The dispersion solution was filtered and washed with water, and furthermore, the cake was repulped to be a 15 mass % spherical silica-particle slurry.

Subsequently, the above-described slurry was filtered, and the resulting cake was dried in a constant-temperature dryer at 110° C. overnight. Thereafter, the cake was pulverized with a sample mill to thereby obtain silica particles G Silica particles G correspond to the aforementioned microporous particles. The particle size distribution of silica particles G was determined with "Multisizer 4" manufactured by Beckman Coulter Inc. using an aperture tube having a diameter of 50 μm. When the film thickness T was 15 μm, the silica particles G have an average particle diameter R1 of 2.7 μm, the standard deviation σ1 being 1.2 μm. The maximum value in the number particle size distribution of silica particles G (the intersection of the particle size distribution curved and the baseline) was 5.7 μm, which was thus less than 15 μm (0.5T).

Coated metal sheets 38 to 40 were each produced in the same manner as coated metal sheet 37 except that the amount of silica particles G blended was changed as shown in Table 2. Additionally, coated metal sheets 41 to 43 were each produced in the same manner as coated metal sheet 38 except that the amount of acrylic particles A blended was changed as shown in Table 2.

[Production of Coated Metal Sheets 44 to 59]

Coated metal sheet 44 was produced in the same manner as coated metal sheet 2 except that overcoat coating material 1 to which 5 vol % of silica particles H (silica H) as the gloss adjusting agent and 5 vol % of PAN particles B (PAN B) as the matting agent was blended was used.

Silica particles H used were "Light Star LA-OS26BK" manufactured by Nissan Chemical Industries, Ltd. ("Light Star" is a registered trademark of the company.). "Light Star LA-OS26BK" corresponds to the aforementioned microporous particles. As determined with "Multisizer 4" manufactured by Beckman Coulter Inc. using an aperture tube having a diameter of 50 μm, silica particles H have an average particle diameter R1 of 0.7 μm, the standard deviation σ2 being 0.2 μm.

PAN particles B used were "TAFTIC A-20" manufactured by Toyobo Co., Ltd. "TAFTIC A-20" which has been produced by a spray dry method, corresponds to the aforementioned microporous particles. As determined with "Multisizer 4" manufactured by Beckman Coulter Inc. using an aperture tube having a diameter of 50 μm, PAN particles B have an average particle diameter R2 of 23 μm, the standard deviation σ2 being 10.7 μm.

Coated metal sheet 45 was produced in the same manner as coated metal sheet 44 except that overcoat coating material 1 to which 0.1 vol % of silica particles A (silica A) was blended as the gloss adjusting agent was used. Silica particles A used were the aforementioned "NIPGEL AZ-400" manufactured by Tosoh Silica Corporation. As determined with "Multisizer 4" manufactured by Beckman Coulter Inc. using an aperture tube having a diameter of 50 μm, silica particles A have an average particle diameter R1 of 3.3 μm, the standard deviation σ2 being 5.8 μm.

Additionally, coated metal sheets 46 to 49 were each produced in the same manner as coated metal sheet 45 except that the amount of silica particles A blended was changed as shown in Tables 2 and 3. Additionally, coated metal sheets 50 to 53 were each produced in the same manner as coated metal sheet 47 except that the amount of PAN particles B blended was changed as shown in Table 3. Additionally, coated metal sheets 54 and 55 were each produced in the same manner as coated metal sheet 47 except that the dry film thickness T was changed as shown in Table 3. Furthermore, coated metal sheets 56 and 57 were each produced in the same manner as coated metal sheet 47 except that the type of the coated base sheet was changed as shown in Table 3. Moreover, coated metal sheets 58 and 59 were each produced in the same manner as coated metal sheet 47 except that the type of the overcoat coating material was changed as shown in Table 3.

[Production of Coated Metal Sheets 60 to 69]

Coated metal sheet 60 was produced in the same manner as coated metal sheet 59 except that acrylic particles D (acrylic D) were used as the matting agent instead of PAN particles B. Acrylic particles D used were "TAFTIC AR-650M" manufactured by Toyobo Co., Ltd. "TAFTIC AR-650M", which has been produced by suspension polymerization, corresponds to the aforementioned primary particles. As determined with "Multisizer 4" manufactured by Beckman Coulter Inc. using an aperture tube having a diameter of 50 μm, acrylic particles D have an average particle diameter R2 of 30 μm, the standard deviation σ2 being 6.7 μm.

Coated metal sheet 61 was produced in the same manner as coated metal sheet 59 except that overcoat coating material 1 to which 5 vol % of silica particles B (silica B) was blended, instead of silica particles A, as the gloss adjusting agent was used. Silica particles B used were the aforementioned "Sylysia300P" manufactured by Fuji Silysia Chemical Ltd. Silica particles B have an average particle diameter R1 of 2.2 μm, the standard deviation σ1 being 0.9 μm.

Additionally, coated metal sheets 62 and 63 were each produced in the same manner as coated metal sheet 60 except that overcoat coating material 1 to which 5 vol % of silica particles B was blended was used and that the amount of silica particles B blended was changed as shown in Table 3. Additionally, coated metal sheets 64 and 65 were each produced in the same manner as coated metal sheet 60 except that overcoat coating material 1 to which 5 vol % of silica particles B was blended was used and that the amount of acrylic particles D blended was changed as shown in Table 3. Additionally, coated metal sheets 66 and 67 were each produced in the same manner as coated metal sheet 60 except that overcoat coating material 1 to which 5 vol % of silica particles B was blended was used and that the dry film thickness T was changed as shown in Table 3.

Additionally, coated metal sheet 68 was produced in the same manner as coated metal sheet 60 except that overcoat coating material 1 to which 5 vol % of silica particles B was blended was used and that acrylic particles C were used instead of acrylic particles D. Acrylic particles C used were the aforementioned "TAFTIC AR-650ML" manufactured by Toyobo Co., Ltd. As determined with "Multisizer 4" manufactured by Beckman Coulter Inc. using an aperture tube having a diameter of 50 μm, acrylic particles C have an average particle diameter R2 of 80 μm, the standard deviation σ2 being 20 μm.

Additionally, coated metal sheet 69 was produced in the same manner as coated metal sheet 68 except that overcoat coating material 1 to which 5 vol % of silica particles B was blended was used and that acrylic particles E (acrylic E) were used instead of acrylic particles C. Acrylic particles E used were the aforementioned "TAFTIC FH-S010" manufactured by Toyobo Co., Ltd. As determined with "Multisizer 4" manufactured by Beckman Coulter Inc. using an aperture tube having a diameter of 50 μm, acrylic particles E have an average particle diameter R2 of 10 μm, the standard deviation σ2 being 6.3 μm.

The type of the coated base sheet, the type and film thickness of the overcoat coating film, the types of the gloss adjusting agent and the matting agent, the number average particle diameter, the standard deviation of the number particle size distribution and the like of coated metal sheets 1 to 69 produced are shown in Tables 1 to 3. Incidentally, "'" of the type of the gloss adjusting agent indicates that the agent has been classified.

TABLE 1

| No. | Coated base sheet | Overcoat Coating material | T (μm) | Gloss adjusting agent Type | R1 (μm) | σ1 (μm) | Content (vol %) | (R1 + 2σ1)/T | Matting agent Type | R2 (μm) | σ2 (μm) | Content (vol %) | (R2 + 2σ2)/T | Primary particles/ Microporous particles | Category |
|---|---|---|---|---|---|---|---|---|---|---|---|---|---|---|---|
| 1 | 1 | 1 | 15 | Silica A' | 2.5 | 1.0 | 0.2 | 0.3 | Acrylic A | 40 | 4.0 | 5 | 3.2 | Primary particles | Example |
| 2 | 1 | 1 | 15 | Silica A' | 2.5 | 1.0 | 5 | 0.3 | Acrylic A | 40 | 4.0 | 5 | 3.2 | Primary particles | |
| 3 | 1 | 1 | 15 | Silica A' | 2.5 | 1.0 | 10 | 0.3 | Acrylic A | 40 | 4.0 | 5 | 3.2 | Primary particles | |
| 4 | 1 | 1 | 15 | Silica A' | 2.5 | 1.0 | 15 | 0.3 | Acrylic A | 40 | 4.0 | 5 | 3.2 | Primary particles | |
| 5 | 1 | 1 | 15 | Silica A' | 2.5 | 1.0 | 5 | 0.3 | Acrylic A | 40 | 4.0 | 0.2 | 3.2 | Primary particles | |
| 6 | 1 | 1 | 15 | Silica A' | 2.5 | 1.0 | 5 | 0.3 | Acrylic A | 40 | 4.0 | 10 | 3.2 | Primary particles | |
| 7 | 1 | 1 | 15 | Silica A' | 2.5 | 1.0 | 5 | 0.3 | Acrylic A | 40 | 4.0 | 15 | 3.2 | Primary particles | |
| 8 | 1 | 1 | 13 | Silica A' | 2.2 | 0.9 | 5 | 0.3 | Acrylic A | 40 | 4.0 | 5 | 3.7 | Primary particles | |
| 9 | 1 | 1 | 17 | Silica A' | 2.8 | 1.1 | 5 | 0.3 | Acrylic A | 40 | 4.0 | 5 | 2.8 | Primary particles | |
| 10 | 1 | 1 | 20 | Silica A' | 3.0 | 1.5 | 5 | 0.3 | Acrylic A | 40 | 4.0 | 5 | 2.4 | Primary particles | |
| 11 | 2 | 1 | 15 | Silica A' | 2.5 | 1.0 | 5 | 0.3 | Acrylic A | 40 | 4.0 | 5 | 3.2 | Primary particles | |
| 12 | 1 | 2 | 15 | Silica A' | 2.5 | 1.0 | 5 | 0.3 | Acrylic A | 40 | 4.0 | 5 | 3.2 | Primary particles | |
| 13 | 1 | 3 | 15 | Silica A' | 2.5 | 1.0 | 5 | 0.3 | Acrylic A | 40 | 4.0 | 5 | 3.2 | Primary particles | |
| 14 | 1 | 1 | 15 | Silica B' | 2.0 | 0.5 | 0.2 | 0.2 | Acrylic A | 40 | 4.0 | 5 | 3.2 | Primary particles | |
| 15 | 1 | 1 | 15 | Silica B' | 2.0 | 0.5 | 5 | 0.2 | Acrylic A | 40 | 4.0 | 5 | 3.2 | Primary particles | |
| 16 | 1 | 1 | 15 | Silica B' | 2.0 | 0.5 | 10 | 0.2 | Acrylic A | 40 | 4.0 | 5 | 3.2 | Primary particles | |
| 17 | 1 | 1 | 15 | Silica B' | 2.0 | 0.5 | 15 | 0.2 | Acrylic A | 40 | 4.0 | 5 | 3.2 | Primary particles | |
| 18 | 1 | 1 | 15 | Silica B' | 2.0 | 0.5 | 5 | 0.2 | Acrylic A | 40 | 4.0 | 0.2 | 3.2 | Primary particles | |
| 19 | 1 | 1 | 15 | Silica B' | 2.0 | 0.5 | 5 | 0.2 | Acrylic A | 40 | 4.0 | 10 | 3.2 | Primary particles | |
| 20 | 1 | 1 | 15 | Silica B' | 2.0 | 0.5 | 5 | 0.2 | Acrylic A | 40 | 4.0 | 15 | 3.2 | Primary particles | |
| 21 | 1 | 1 | 13 | Silica B' | 1.9 | 0.4 | 5 | 0.2 | Acrylic A | 40 | 4.0 | 5 | 3.7 | Primary particles | |
| 22 | 1 | 1 | 17 | Silica B' | 2.1 | 0.7 | 5 | 0.2 | Acrylic A | 40 | 4.0 | 5 | 2.8 | Primary particles | |
| 23 | 1 | 1 | 20 | Silica B' | 2.2 | 0.8 | 5 | 0.2 | Acrylic A | 40 | 4.0 | 5 | 2.4 | Primary particles | |

TABLE 2

| No. | Coated base sheet | Overcoat Coating material | T (μm) | Gloss adjusting agent Type | R1 (μm) | σ1 (μm) | Content (vol %) | (R1 + 2σ1)/T | Matting agent Type | R2 (μm) | σ2 (μm) | Content (vol %) | (R2 + 2σ2)/T | Primary particles/ Microporous particles | Category |
|---|---|---|---|---|---|---|---|---|---|---|---|---|---|---|---|
| 24 | 2 | 1 | 15 | Silica B' | 2.0 | 0.5 | 5 | 0.2 | Acrylic A | 40 | 4.0 | 5 | 3.2 | Primary particles | Example |
| 25 | 1 | 2 | 15 | Silica B' | 2.0 | 0.5 | 5 | 0.2 | Acrylic A | 40 | 4.0 | 5 | 3.2 | Primary particles | |
| 26 | 1 | 3 | 15 | Silica B' | 2.0 | 0.5 | 5 | 0.2 | Acrylic A | 40 | 4.0 | 5 | 3.2 | Primary particles | |
| 27 | 1 | 1 | 15 | Silica C' | 3.5 | 2.2 | 5 | 0.5 | Acrylic A | 40 | 4.0 | 5 | 3.2 | Primary particles | |
| 28 | 1 | 1 | 15 | Silica D' | 3.7 | 2.1 | 5 | 0.5 | Acrylic A | 40 | 4.0 | 5 | 3.2 | Primary particles | |
| 29 | 1 | 1 | 13 | Silica E' | 7.9 | 0.6 | 5 | 0.7 | Acrylic A | 40 | 4.0 | 5 | 3.7 | Primary particles | |
| 30 | 1 | 1 | 13 | Silica F | 7.5 | 0.8 | 5 | 0.7 | Acrylic A | 40 | 4.0 | 5 | 3.7 | Primary particles | |
| 31 | 1 | 1 | 15 | PAN A' | 5.0 | 0.6 | 5 | 0.4 | Acrylic A | 40 | 4.0 | 5 | 3.2 | Primary particles | |
| 32 | 1 | 1 | 15 | CaCPC A' | 5.0 | 0.5 | 5 | 0.4 | Acrylic A | 40 | 4.0 | 5 | 3.2 | Primary particles | |
| 33 | 1 | 1 | 15 | Silica B' | 2.0 | 0.5 | 5 | 0.2 | Urethane | 30 | 3.0 | 5 | 2.4 | Primary particles | |
| 34 | 1 | 1 | 15 | Silica B' | 2.0 | 0.5 | 5 | 0.2 | Glass | 20 | 5.0 | 5 | 2.0 | Primary particles | |
| 35 | 1 | 1 | 15 | Silica B' | 2.0 | 0.5 | 5 | 0.2 | Acrylic B | 60 | 5.0 | 5 | 4.7 | Primary particles | |
| 36 | 1 | 1 | 15 | Silica B' | 2.0 | 0.5 | 5 | 0.2 | Acrylic C | 75 | 15.0 | 5 | 7.0 | Primary particles | |
| 37 | 1 | 1 | 15 | Silica G | 2.7 | 1.2 | 0.2 | 0.3 | Acrylic A | 40 | 4.0 | 5 | 3.2 | Primary particles | |
| 38 | 1 | 1 | 15 | Silica G | 2.7 | 1.2 | 5 | 0.3 | Acrylic A | 40 | 4.0 | 5 | 3.2 | Primary particles | |
| 39 | 1 | 1 | 15 | Silica G | 2.7 | 1.2 | 10 | 0.3 | Acrylic A | 40 | 4.0 | 5 | 3.2 | Primary particles | |
| 40 | 1 | 1 | 15 | Silica G | 2.7 | 1.2 | 15 | 0.3 | Acrylic A | 40 | 4.0 | 5 | 3.2 | Primary particles | |
| 41 | 1 | 1 | 15 | Silica G | 2.7 | 1.2 | 5 | 0.3 | Acrylic A | 40 | 4.0 | 1 | 3.2 | Primary particles | |
| 42 | 1 | 1 | 15 | Silica G | 2.7 | 1.2 | 5 | 0.3 | Acrylic A | 40 | 4.0 | 10 | 3.2 | Primary particles | |
| 43 | 1 | 1 | 15 | Silica G | 2.7 | 1.2 | 5 | 0.3 | Acrylic A | 40 | 4.0 | 15 | 3.2 | Primary particles | |
| 44 | 1 | 1 | 15 | Silica H | 0.7 | 0.2 | 5 | 0.1 | PAN B | 23 | 10.7 | 5 | 3.0 | Microporous particles | Comparative |
| 45 | 1 | 1 | 15 | Silica A | 3.3 | 5.8 | 0.1 | 1.0 | PAN B | 23 | 10.7 | 5 | 3.0 | Microporous particles | Example |
| 46 | 1 | 1 | 15 | Silica A | 3.3 | 5.8 | 1 | 1.0 | PAN B | 23 | 10.7 | 5 | 3.0 | Microporous particles | |

TABLE 3

| No. | Coated base sheet | Overcoat Coating material | T (μm) | Gloss adjusting agent Type | R1 (μm) | σ1 (μm) | Content (vol %) | (R1 + 2σ1)/T | Matting agent Type | R2 (μm) | σ2 (μm) | Content (vol %) | (R2 + 2σ2)/T | Primary particles/ Microporous particles | Category |
|---|---|---|---|---|---|---|---|---|---|---|---|---|---|---|---|
| 47 | 1 | 1 | 15 | Silica A | 3.3 | 5.8 | 5 | 1.0 | PAN B | 23 | 10.7 | 5 | 3.0 | Microporous particles | Comparative |
| 48 | 1 | 1 | 15 | Silica A | 3.3 | 5.8 | 13 | 1.0 | PAN B | 23 | 10.7 | 5 | 3.0 | Microporous particles | Example |
| 49 | 1 | 1 | 15 | Silica A | 3.3 | 5.8 | 20 | 1.0 | PAN B | 23 | 10.7 | 5 | 3.0 | Microporous particles | |
| 50 | 1 | 1 | 15 | Silica A | 3.3 | 5.8 | 5 | 1.0 | PAN B | 23 | 10.7 | 0.1 | 3.0 | Microporous particles | |
| 51 | 1 | 1 | 15 | Silica A | 3.3 | 5.8 | 5 | 1.0 | PAN B | 23 | 10.7 | 1 | 3.0 | Microporous particles | |
| 52 | 1 | 1 | 15 | Silica A | 3.3 | 5.8 | 5 | 1.0 | PAN B | 23 | 10.7 | 13 | 3.0 | Microporous particles | |
| 53 | 1 | 1 | 15 | Silica A | 3.3 | 5.8 | 5 | 1.0 | PAN B | 23 | 10.7 | 20 | 3.0 | Microporous particles | |
| 54 | 1 | 1 | 8 | Silica A | 3.3 | 5.8 | 5 | 1.9 | PAN B | 23 | 10.7 | 5 | 5.6 | Microporous particles | |
| 55 | 1 | 1 | 22 | Silica A | 3.3 | 5.8 | 5 | 0.7 | PAN B | 23 | 10.7 | 5 | 2.0 | Microporous particles | |
| 56 | 3 | 1 | 15 | Silica A | 3.3 | 5.8 | 5 | 1.0 | PAN B | 23 | 10.7 | 5 | 3.0 | Microporous particles | Reference Example |
| 57 | 2 | 1 | 15 | Silica A | 3.3 | 5.8 | 5 | 1.0 | PAN B | 23 | 10.7 | 5 | 3.0 | Microporous particles | Comparative |
| 58 | 1 | 2 | 15 | Silica A | 3.3 | 5.8 | 5 | 1.0 | PAN B | 23 | 10.7 | 5 | 3.0 | Microporous particles | Example |
| 59 | 1 | 3 | 15 | Silica A | 3.3 | 5.8 | 5 | 1.0 | PAN B | 23 | 10.7 | 5 | 3.0 | Microporous particles | |
| 60 | 1 | 3 | 15 | Silica A | 3.3 | 5.8 | 5 | 1.0 | Acrylic D | 30 | 6.7 | 5 | 2.9 | Primary particles | |
| 61 | 1 | 1 | 15 | Silica B | 2.2 | 0.9 | 5 | 0.3 | PAN B | 23 | 10.7 | 5 | 3.0 | Microporous particles | |
| 62 | 1 | 1 | 15 | Silica B | 2.2 | 0.9 | 0.1 | 0.3 | Acrylic D | 30 | 6.7 | 5 | 2.9 | Primary particles | |
| 63 | 1 | 1 | 15 | Silica B | 2.2 | 0.9 | 20 | 0.3 | Acrylic D | 30 | 6.7 | 5 | 2.9 | Primary particles | |
| 64 | 1 | 1 | 15 | Silica B | 2.2 | 0.9 | 5 | 0.3 | Acrylic D | 30 | 6.7 | 0.1 | 2.9 | Primary particles | |
| 65 | 1 | 1 | 15 | Silica B | 2.2 | 0.9 | 5 | 0.3 | Acrylic D | 30 | 6.7 | 20 | 2.9 | Primary particles | |
| 66 | 1 | 1 | 8 | Silica B | 2.2 | 0.9 | 5 | 0.5 | Acrylic D | 30 | 6.7 | 5 | 5.4 | Primary particles | |

TABLE 3-continued

| | | Overcoat | | Gloss adjusting agent | | | | Matting agent | | | | | |
|---|---|---|---|---|---|---|---|---|---|---|---|---|---|
| No. | Coated base sheet | Coating material | T (μm) | Type | R1 (μm) | σ1 (μm) | Content (vol %) | (R1 + 2σ1)/ T | Type | R2 (μm) | σ2 (μm) | Content (vol %) | (R2 + 2σ2)/ T | Microporous particles/ Primary particles | Category |
| 67 | 1 | 1 | 22 | Silica B | 2.2 | 0.9 | 5 | 0.2 | Acrylic D | 30 | 6.7 | 5 | 2.0 | Primary particles | |
| 68 | 1 | 1 | 15 | Silica B | 2.2 | 0.9 | 5 | 0.3 | Acrylic C | 80 | 20 | 5 | 8.0 | Primary particles | |
| 69 | 1 | 1 | 15 | Silica B | 2.2 | 0.9 | 5 | 0.3 | Acrylic E | 10 | 6.3 | 5 | 1.5 | Primary particles | |

[Evaluation]

Coated metal sheets 1 to 69 were each subjected to the measurement and test described below.

(1) Glossiness at 75 Degrees

Glossiness at 75 degrees (G75), specified by JIS Z8741, of each of coated metal sheets 1 to 69 was measured with Gloss meter VG-2000 manufactured by NIPPON DENSHOKU INDUSTRIES CO., LTD.

(2) Coating Appearance

The appearance of the coating film of each of coated metal sheets 1 to 69 after drying was evaluated in accordance with the following criteria.

(Evaluation Criteria)

Y1: No abnormal gloss and coating film defects are observed, and a satisfactory appearance is observed.

Y2: Any of abnormalities D1 to D3 shown below is observed.

D1: Gloss is extremely high (glossiness is higher than 25)

D2: Foaming is observed

D3: Streaks are observed (3) Scratch Resistance

Clemens-type scratch test was conducted by using a diamond needle having a diameter of 125 μm and applying a load of 400 g, and evaluation was made in accordance with the following criteria.

(Evaluation Criteria)

N: No scratch reaching the base material (metal sheet) is observed

Y: Scratches reaching the base material (metal sheet) are observed (4) Processed-Part Adhesiveness Coated metal sheets 1 to 69 were each subjected to 0T bending (adhesion bending), and the 0T bended portion was subjected to cellophane tape-peeling test and evaluated in accordance with the following criteria.

(Evaluation Criteria)

N: Peeling of the coating film is not observed

Y: Peeling of the coating film is observed (5) Flat Portion-Corrosion Resistance First, coated metal sheets 1 to 69 were each subjected to the xenon lamp method-accelerated weathering test specified by JIS K5600-7-7 (ISO11341: 2004) for 1,000 hours. Then, each sheet was subjected to the "neutral salt water spray cycle test" specified by JIS H8502 (so-called JASO method) for 720 hours. The above-described two tests were conducted as one cycle. Test products subjected to one cycle (corresponding to about five-year service life in actual use) and test products subjected to two cycles (corresponding to about 10-year service life) each for coated metal sheets 1 to 69 were washed with water. After observed for the presence or absence of coating film blistering at the flat portion of the coated metal sheet by visual observation and magnified observation with a loupe having a magnification of 10, the sheets were evaluated in accordance with the following criteria.

(Evaluation Criteria)

N: No blistering is observed

Y1: Slightly subtle blistering is observed by magnified observation, but no blistering is visually observed Y2: Blistering is visually observed The evaluation results of coated metal sheets 1 to 69 are shown in Tables 4 to 6.

TABLE 4

| No. | G75 | Coating appearance | Scratch resistance | Processed-part adhesiveness | Flat portion corrosion 1 cycle | Flat portion corrosion 2 cycles | Category |
|---|---|---|---|---|---|---|---|
| 1 | 24 | Y1 | Y1 | Y1 | N | N | Example |
| 2 | 18 | Y1 | Y1 | Y1 | N | N | |
| 3 | 5 | Y1 | Y1 | Y1 | N | N | |
| 4 | 3 | Y1 | Y1 | Y1 | N | N | |
| 5 | 25 | Y1 | Y1 | Y1 | N | N | |
| 6 | 10 | Y1 | Y1 | Y1 | N | N | |
| 7 | 7 | Y1 | Y1 | Y1 | N | N | |
| 8 | 15 | Y1 | Y1 | Y1 | N | N | |
| 9 | 19 | Y1 | Y1 | Y1 | N | N | |
| 10 | 21 | Y1 | Y1 | Y1 | N | N | |
| 11 | 17 | Y1 | Y1 | Y1 | N | N | |
| 12 | 18 | Y1 | Y1 | Y1 | N | N | |
| 13 | 18 | Y1 | Y1 | Y1 | N | N | |
| 14 | 25 | Y1 | Y1 | Y1 | N | N | |
| 15 | 17 | Y1 | Y1 | Y1 | N | N | |
| 16 | 4 | Y1 | Y1 | Y1 | N | N | |
| 17 | 2 | Y1 | Y1 | Y1 | N | N | |
| 18 | 25 | Y1 | Y1 | Y1 | N | N | |
| 19 | 10 | Y1 | Y1 | Y1 | N | N | |
| 20 | 6 | Y1 | Y1 | Y1 | N | N | |
| 21 | 16 | Y1 | Y1 | Y1 | N | N | |
| 22 | 18 | Y1 | Y1 | Y1 | N | N | |
| 23 | 19 | Y1 | Y1 | Y1 | N | N | |

TABLE 5

| No. | G75 | Coating appearance | Scratch resistance | Processed-part adhesiveness | Flat portion corrosion resistance 1 cycle | Flat portion corrosion resistance 2 cycles | Category |
|---|---|---|---|---|---|---|---|
| 24 | 17 | Y1 | Y1 | Y1 | N | N | Example |
| 25 | 16 | Y1 | Y1 | Y1 | N | N | |
| 26 | 17 | Y1 | Y1 | Y1 | N | N | |
| 27 | 16 | Y1 | Y1 | Y1 | N | N | |
| 28 | 17 | Y1 | Y1 | Y1 | N | N | |
| 29 | 15 | Y1 | Y1 | Y1 | N | Y1 | |
| 30 | 15 | Y1 | Y1 | Y1 | N | Y1 | |
| 31 | 12 | Y1 | Y1 | Y1 | N | N | |
| 32 | 12 | Y1 | Y1 | Y1 | N | N | |
| 33 | 19 | Y1 | Y1 | Y1 | N | N | |
| 34 | 23 | Y1 | Y1 | Y1 | N | N | |
| 35 | 4 | Y1 | Y1 | Y1 | N | N | |
| 36 | 3 | Y1 | Y1 | Y1 | N | N | |
| 37 | 25 | Y1 | Y1 | Y1 | N | N | |

TABLE 5-continued

| No. | G75 | Coating appearance | Scratch resistance | Processed-part adhesiveness | Flat portion corrosion resistance 1 cycle | Flat portion corrosion resistance 2 cycles | Category |
|---|---|---|---|---|---|---|---|
| 38 | 17 | Y1 | Y1 | Y1 | N | N | |
| 39 | 5 | Y1 | Y1 | Y1 | N | N | |
| 40 | 4 | Y1 | Y1 | Y1 | N | N | |
| 41 | 24 | Y1 | Y1 | Y1 | N | N | |
| 42 | 9 | Y1 | Y1 | Y1 | N | N | |
| 43 | 7 | Y1 | Y1 | Y1 | N | N | |
| 44 | 29 | Y2 D1 | Y1 | Y1 | — | — | Comparative |
| 45 | 28 | Y2 D1 | Y1 | Y1 | — | — | Example |
| 46 | 22 | Y1 | Y1 | Y1 | Y2 | Y2 | |

TABLE 6

| No. | G75 | Coating appearance | Scratch resistance | Processed-part adhesiveness | Flat portion corrosion resistance 1 cycle | Flat portion corrosion resistance 2 cycles | Category |
|---|---|---|---|---|---|---|---|
| 47 | 19 | Y1 | Y1 | Y1 | Y2 | Y2 | Comparative |
| 48 | 5 | Y1 | Y1 | Y1 | Y2 | Y2 | ative |
| 49 | 2 | Y1 | Y1 | Y2 | — | — | Example |
| 50 | 49 | Y2 D1 | Y2 | Y1 | — | — | |
| 51 | 25 | Y1 | Y1 | Y1 | Y2 | Y2 | |
| 52 | 7 | Y1 | Y1 | Y1 | Y2 | Y2 | |
| 53 | 1 | Y1 | Y1 | Y2 | — | — | |
| 54 | 16 | Y1 | Y2 | Y1 | — | — | |
| 55 | — | Y2 D2 | Y1 | Y1 | — | — | |
| 56 | 19 | Y1 | Y1 | Y1 | N | Y1 | Reference Example |
| 57 | 19 | Y1 | Y1 | Y1 | Y2 | Y2 | Comparative |
| 58 | 18 | Y1 | Y1 | Y1 | Y2 | Y2 | ative |
| 59 | 19 | Y1 | Y1 | Y1 | Y2 | Y2 | Example |
| 60 | 17 | Y1 | Y1 | Y1 | Y2 | Y2 | |
| 61 | 21 | Y1 | Y1 | Y1 | Y2 | Y2 | |
| 62 | 29 | Y2 D1 | Y1 | Y1 | — | — | |
| 63 | 5 | Y1 | Y1 | Y2 | — | — | |
| 64 | 51 | Y2 D1 | Y2 | Y1 | — | — | |
| 65 | 3 | Y1 | Y1 | Y2 | — | — | |
| 66 | 14 | Y1 | Y2 | Y1 | — | — | |
| 67 | — | Y2 D2 | Y1 | Y1 | — | — | |
| 68 | — | Y2 D3 | Y1 | Y1 | — | — | |
| 69 | 32 | Y2 D1 | Y2 | Y1 | — | — | |

As clear from Tables 2, 3, 5, and 6 coated metal sheet 44 in which the gloss adjusting agent had a number average particle diameter R1 less than 2 μm and coated metal sheets 45 and 62 in which the content of the gloss adjusting agent in the overcoat coating film was less than 0.2 vol % did not achieve the intended glossiness and had an inferior coating appearance. Additionally, coated metal sheets 50 and 64 having a matting agent-content less than 0.2 vol % and coated metal sheet 69 having $(R2+2\sigma2)/T$ less than 2.0 did not achieve the intended gloss and had an inferior coating appearance and inferior scratch resistance. Furthermore, coated metal sheet 68 having $(R2+2\sigma2)/T$ more than 7.0 had the occurrence of streaks and had an inferior coating appearance.

Coated metal sheets 54 and 66 in which the overcoat coating film had a film thickness less than 13 μm had inferior scratch resistance. Meanwhile, coated metal sheets 55 and 67 in which the overcoat coating film had a film thickness more than 20 μm had the occurrence of foaming and an inferior coating appearance.

Coated metal sheets 49 and 63 in which the content of the gloss adjusting agent in the overcoat coating film was more than 15 vol % and coated metal sheets 53 and 65 in which the content of the matting agent in the overcoat coating film was more than 15 vol % had inferior processed-part adhesiveness.

Coated metal sheet 60 having $(R1+2\sigma1)/T$ more than 0.7, coated metal sheet 61 in which microporous particles were used as the matting agent, or coated metal sheets 46 to 48, 51, 52, 57 to 59 satisfying both of these were not able to achieve even flat portion-corrosion resistance, which corresponds to five years of actual use.

In contrast, as clearly from Tables 1, 2, 4, and 5, coated metal sheets 1 to 43 in which the gloss adjusting agent had a number average particle diameter R1 of 2 μm or more and $(R1+2\sigma1)/T$ of 0.7 or less, the matting agent was primary particles and had $(R2+2\sigma2)/T$ of 2.0 or more and 7.0 or less, and the overcoat coating film had a film thickness T of 13 μm or more and 20 μm or less achieved the intended glossiness and were excellent in any of the coating appearance, scratch resistance, processed-part adhesiveness, and flat portion-corrosion resistance. Particularly, the flat portion-corrosion resistance of the coated metal sheets 1 to 43 was, apparent from the comparison with coated metal sheet 56, equivalent to or greater than the flat portion-corrosion resistance of a coated metal sheet subjected to chromate-containing chemical conversion and containing chromium as the anti-rust pigment.

This application claims the priority of Japanese Patent Application No. 2014-59950 filed on Mar. 24, 2014, the entire contents of which including the specification and drawings are incorporated herein by reference.

INDUSTRIAL APPLICABILITY

In the coated metal sheet according to the present invention, reduction in the corrosion resistance in the flat portion, attributable to collapse and fall-off of the gloss adjusting agent and the matting agent from the overcoat coating film, is prevented. Thus, a coated metal sheet that exhibits the intended appearance and corrosion resistance for a long period can be obtained, even if used in an exterior application for a long period. Accordingly, the present invention is expected to further prolong the life of coated metal sheets for exterior use and to further enhance their usage.

The invention claimed is:

1. A coated metal sheet being chromate-free and comprising a metal sheet and an overcoat coating film disposed on the metal sheet,
wherein the metal sheet is any one selected from the group consisting of a cold-rolled steel sheet, a galvanized steel sheet, a Zn—Al alloy-plated steel sheet, a Zn—Al—Mg alloy-plated steel sheet, an aluminum-plated steel sheet, a stainless steel sheet, and a copper sheet,
wherein the overcoat coating film comprises a gloss adjusting agent which is particles having micropores and a matting agent which is primary particles,
wherein a content of the gloss adjusting agent in the overcoat coating film is 0.2 to 15 vol %,
wherein a content of the matting agent in the overcoat coating film is 0.2 to 15 vol %, and
wherein the coated metal sheet satisfies the following equations:

$(R1+2\sigma1)/T \leq 0.7$ $R1 \geq 2.0$ $2.0 \leq (R2+2\sigma2)/T \leq 7.0$ $13 \leq T \leq 20$ $\sigma1 < 0.3T$ wherein R1 (μm) is a number average particle diameter of the gloss adjusting agent, R2 (μm) is a number average particle diameter of the matting agent, T (μm) is a film thickness of the overcoat coating film, σ1 is a standard deviation of a number particle size distribution of the gloss adjusting agent, and σ2 is a standard deviation of a number particle size distribution of the matting agent.

2. The coated metal sheet according to claim 1, further comprising an undercoat coating film between the metal sheet and the overcoat coating film.

3. The coated metal sheet according to claim 1, wherein the gloss adjusting agent is silica.

4. The coated metal sheet according to claim 1, wherein a value L of the overcoat coating film is 80 or less, and the film thickness T of the overcoat coating film is 15 μm or less.

5. The coated metal sheet according to claim 1, wherein a value L of the overcoat coating film is more than 80, and the film thickness T of the overcoat coating film is more than 15 μm.

6. The coated metal sheet according to claim 1, wherein an absolute value ΔL of a difference between a value L of the overcoat coating film and a value L of a color of a surface of the metal sheet before the overcoat coating film is formed is 10 or less, and the film thickness T of the overcoat coating film is 13 μm or less.

7. The coated metal sheet according to claim 1, wherein an absolute value ΔL of a difference between a value L of the overcoat coating film and a value L of a color of a surface of the metal sheet before the overcoat coating film is formed is 20 or less, and the film thickness T of the overcoat coating film is 15 μm or less.

8. The coated metal sheet according to claim 1, wherein an absolute value ΔL of a difference between a value L of the overcoat coating film and a value L of a color of a surface of the metal sheet before the overcoat coating film is formed is 50 or less, and the film thickness T of the overcoat coating film is 17 μm or less.

9. The coated metal sheet according to claim 1, wherein the coated metal sheet has a glossiness at 75 degrees of 1 to 25.

10. The coated metal sheet according to claim 1, wherein the coated metal sheet is a coated metal sheet for exterior use.

11. An exterior building material composed of the coated metal sheet according to claim 1.

12. The exterior building material according to claim 11, further comprising one or more selected from the group consisting of members to fix the exterior building material to a building, members to connect a plurality of the exterior building materials, marks that show a direction of the exterior building material on mounting, and foam sheets or foam layers to improve thermal insulation properties.

13. A coated metal sheet being chromate-free and comprising a metal sheet and an overcoat coating film to be disposed on the metal sheet,
wherein the metal sheet is any one selected from the group consisting of a cold-rolled steel sheet, a galvanized steel sheet, a Zn—Al alloy-plated steel sheet, a Zn—Al—Mg alloy-plated steel sheet, an aluminum-plated steel sheet, a stainless steel sheet, and a copper sheet,
wherein the overcoat coating film comprises a gloss adjusting agent which is particles having micropores and a matting agent which is primary particles,
wherein a content of the gloss adjusting agent in the overcoat coating film is 0.2 to 15 vol %,
wherein a content of the matting agent in the overcoat coating film is 0.2 to 15 vol %, and
wherein the coated metal sheet satisfies the following equations:

$$R1 \geq 2.0$$

$$2.0 \leq (R2+2\sigma2)/T \leq 7.0$$

$$13 \leq T \leq 20$$

wherein R1 (μm) is a number average particle diameter of the gloss adjusting agent, R2 (μm) is a number average particle diameter of the matting agent, T (μm) is a film thickness of the overcoat coating film, and σ2 is a standard deviation of a number particle size distribution of the matting agent, and a maximum value of a particle diameter in a number particle size distribution of the gloss adjusting agent is 0.7T or less.

14. The coated metal sheet according to claim 13, wherein the maximum value of the particle diameter in the number particle size distribution of the gloss adjusting agent is 0.6T or less.

15. The coated metal sheet according to claim 13, further comprising an undercoat coating film between the metal sheet and the overcoat coating film.

16. The coated metal sheet according to claim 13, wherein the gloss adjusting agent is silica.

17. The coated metal sheet according to claim 13, wherein a value L of the overcoat coating film is 80 or less, and the film thickness T of the overcoat coating film is 15 μm or less.

18. The coated metal sheet according to claim 13, wherein a value L of the overcoat coating film is more than 80, and the film thickness T of the overcoat coating film is more than 15 μm.

19. The coated metal sheet according to claim 13, wherein an absolute value ΔL of a difference between a value L of the overcoat coating film and a value L of a color of a surface of the metal sheet before the overcoat coating film is formed is 10 or less, and the film thickness T of the overcoat coating film is 13 μm or less.

20. The coated metal sheet according to claim 13, wherein an absolute value ΔL of a difference between a value L of the overcoat coating film and a value L of a color of a surface of the metal sheet before the overcoat coating film is formed is 20 or less, and the film thickness T of the overcoat coating film is 15 μm or less.

21. The coated metal sheet according to claim 13, wherein an absolute value ΔL of a difference between a value L of the overcoat coating film and a value L of a color of a surface of the metal sheet before the overcoat coating film is formed is 50 or less, and the film thickness T of the overcoat coating film is 17 μm or less.

22. The coated metal sheet according to claim 13, wherein the coated metal sheet has a glossiness at 75 degrees of 1 to 25.

23. The coated metal sheet according to claim 13, wherein the coated metal sheet is a coated metal sheet for exterior use.

24. An exterior building material composed of the coated metal sheet according to claim 23.

25. The exterior building material according to claim 24, further comprising one or more selected from the group consisting of members to fix the exterior building material to a building, members to connect a plurality of the exterior building materials, marks that show a direction of the exterior building material on mounting, and foam sheets or foam layers to improve thermal insulation properties.

* * * * *